United States Patent
Wyndham et al.

(10) Patent No.: US 11,161,065 B2
(45) Date of Patent: Nov. 2, 2021

(54) FILTRATION DEVICE FOR CHROMATOGRAPHIC INSTRUMENTS

(71) Applicant: Waters Technologies Corporation, Milford, MA (US)

(72) Inventors: Kevin D. Wyndham, Upton, MA (US); Moon Chul Jung, Waltham, MA (US); Abhijit Tarafder, Franklin, MA (US); Wade P. Leveille, Sr., Douglas, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 16/375,908

(22) Filed: Apr. 5, 2019

(65) Prior Publication Data

US 2019/0321759 A1 Oct. 24, 2019

Related U.S. Application Data

(60) Provisional application No. 62/659,733, filed on Apr. 19, 2018.

(51) Int. Cl.
*B01D 29/96* (2006.01)
*B01D 29/05* (2006.01)
(Continued)

(52) U.S. Cl.
CPC ........... *B01D 29/96* (2013.01); *B01D 15/125* (2013.01); *B01D 29/05* (2013.01); *B01D 29/50* (2013.01);
(Continued)

(58) Field of Classification Search
CPC ...... B01D 29/96; B01D 15/125; B01D 29/05; B01D 29/50; B01D 29/66; B01D 35/143; B01D 29/055
See application file for complete search history.

(56) References Cited

U.S. PATENT DOCUMENTS 5,305,650 A * 4/1994 Koike ............... G01N 1/28
73/864.21
2010/0305305 A1* 12/2010 Poulle ............... C07K 14/755
530/383
(Continued)

FOREIGN PATENT DOCUMENTS

WO 2012095923 A1 7/2012
WO WO-2012095923 A1 * 7/2012 ............ G01N 30/32

OTHER PUBLICATIONS

International Preliminary Report on Patentability in corresponding PCT Patent Application No. PCT/US2019/025927 dated Oct. 20, 2020. 8 pages.
(Continued)

*Primary Examiner* — Ryan B Huang
(74) *Attorney, Agent, or Firm* — Schmeiser, Olsen & Watts LLP; Victor J. Baranowski

(57) ABSTRACT

A liquid chromatography system, includes a fluidic flow path, a chromatography column located in the fluidic flow path, a filtration device located in the fluidic flow path before the chromatography column, the filtration device including a housing having a fluidic inlet, a fluidic outlet, wherein at least a portion of the fluidic flow path is located between the fluidic inlet and the fluidic outlet and at least one filter disposed in the portion of the fluidic flow path, wherein the at least one filter is made of a micromachined material. Liquid chromatography filtration methods are further disclosed.

22 Claims, 14 Drawing Sheets

(51) Int. Cl.
    *B01D 29/50*     (2006.01)
    *B01D 15/12*     (2006.01)
    *B01D 35/143*     (2006.01)
    *B01D 29/66*     (2006.01)

(52) U.S. Cl.
    CPC ........... *B01D 29/66* (2013.01); *B01D 35/143* (2013.01); *B01D 2201/184* (2013.01)

(56) References Cited

U.S. PATENT DOCUMENTS

2014/0124444 A1    5/2014    Anspach et al.
2014/0305228 A1*  10/2014  Witt ....................... B01D 39/14
                                                           73/863.23

OTHER PUBLICATIONS

Application No. PCT/US2019/025927, International Search Report and the Written Opinion of the International Searching Authority, or the Declaration dated Jul. 19, 2019.

* cited by examiner

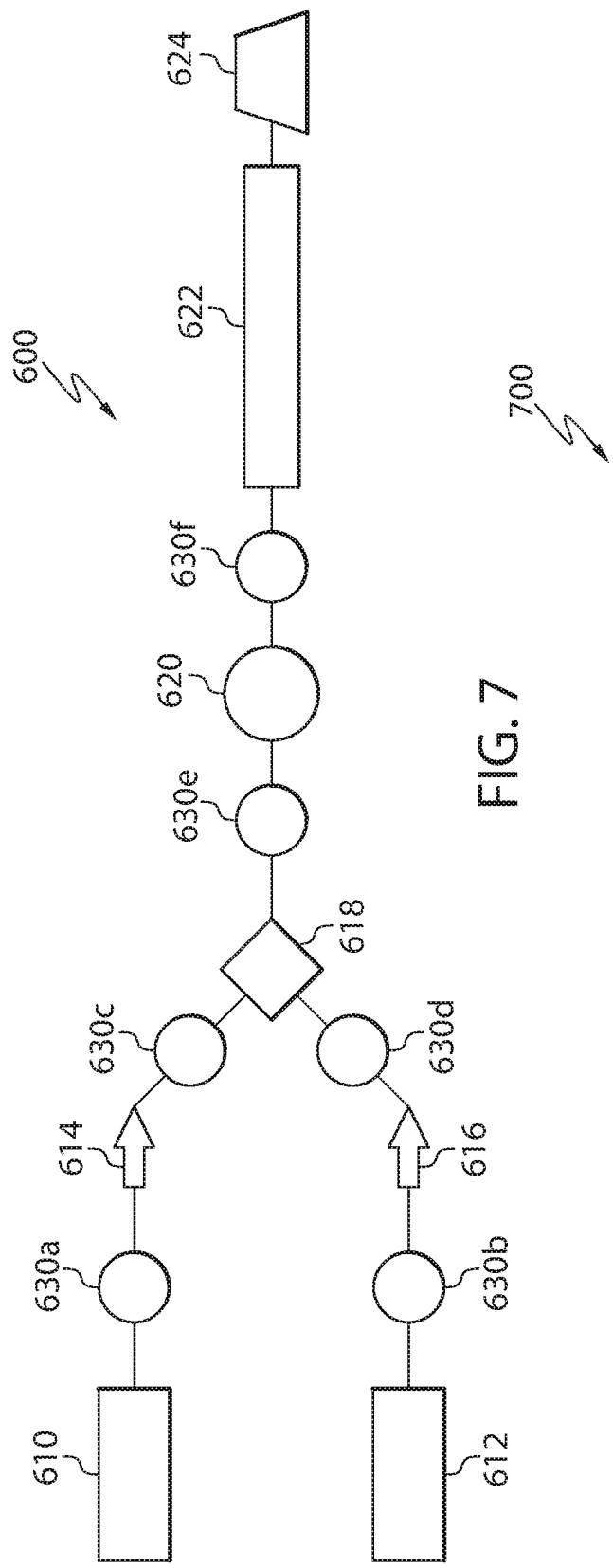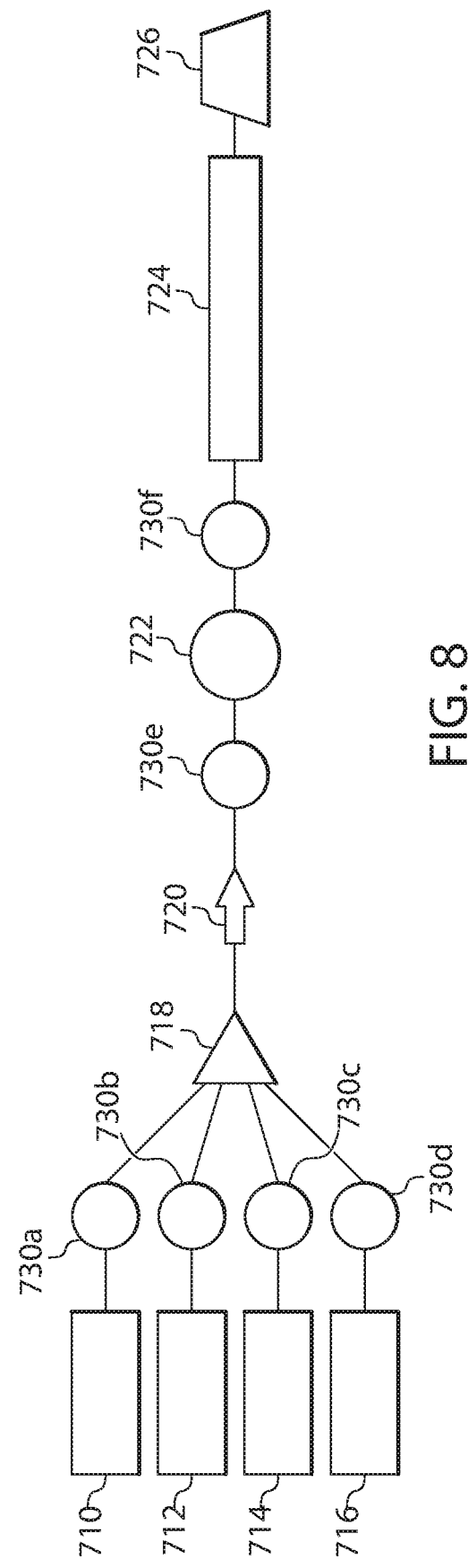

FILTRATION DEVICE FOR CHROMATOGRAPHIC INSTRUMENTS

RELATED APPLICATIONS

This application is a non-provisional patent application claiming priority to U.S. Provisional Patent Application No. 62/659,733, filed Apr. 19, 2018, entitled "Filtration Device for Chromatographic Instruments," which is incorporated herein by reference.

TECHNICAL FIELD

The present invention relates to filtration devices for liquid chromatographic (LC) systems. More specifically, the invention relates to filtration devices and methods for filtering particulates from chromatographic fluid paths.

BACKGROUND

Particulates come from various sources in chromatographic fluid paths. Particulates can be from, for example, a liquid chromatographic (LC) solvent itself, mobile phase buffer crystals and impurities, microbial growth, environmental sources, or any mechanical shedding from the chromatography instruments. Particulates pose significant risk to the robustness and accuracy of chromatography instrumentation. With the development of high performance liquid chromatography (UPLC) instruments and the use of small bore tubing and miniaturized components, the UPLC system has become more vulnerable to problems stemming from particulates being found in chromatographic fluid paths.

Particulates can be removed from fluidic paths using filters. Current filters are made by sintering and have ill-defined pore size distribution resulting in particulates passing through the filter that are either larger or smaller than the purported pore size of the filter. These particulates often get trapped and accumulate inside the tortuous pores of the filter. Thus, it is common for LC filters to become clogged as a result of these deficiencies and through long term use. If left un-replaced, clogged filters could negatively impact pressure and other conditions in LC systems.

Thus, improved filters for LC systems, along with a liquid chromatography system incorporating improved filtration, along with accompanying methods, would be well received in the art.

SUMMARY

In accordance with one embodiment, a liquid chromatography system includes a fluidic flow path, a chromatography column located in the fluidic flow path, a filtration device located in the fluidic flow path before the chromatography column, the filtration device including: a housing having a fluidic inlet, a fluidic outlet, wherein at least a portion of the fluidic flow path is located between the fluidic inlet and the fluidic outlet; and at least one filter disposed in the portion of the fluidic flow path, wherein the at least one filter is made of a micromachined material.

Additionally or alternatively, the filtration device further comprises a detection system configured to automatically determine when the at least one filter is clogged.

Additionally or alternatively, the detection system includes a first pressure gauge located before the filtration device in the fluidic flow path and a second pressure gauge located after the filtration device in the fluidic flow path.

Additionally or alternatively, the filtration device further includes a filter element mounted on a filter movement stage, the filter movement stage in communication with the detection system, wherein a plurality of filters including the at least one filter is disposed on the filter element and wherein the filter movement stage is configured to move the filter element.

Additionally or alternatively, the filtration device further includes a dynamic sealing mechanism configured such that: when the filtration device is in a first position there is a fluidic seal between the filter element and the fluidic flow path such that fluid can flow from the fluidic inlet to the fluidic outlet through the filter element, and when the filtration device is in a second position the fluidic flow path is isolated from the filter element on both sides of the filter element.

Additionally or alternatively, the filter movement stage is configured to move the filter element when the filtration device is in the second position to automatically change the at least one filter disposed in the portion of the fluidic flow path with the second filter of the plurality of filters when the detection system determines that the at least one filter is clogged.

Additionally or alternatively, the filter element is a ribbon.

Additionally or alternatively, the filter element is a disc.

Additionally or alternatively, the filtration device further includes a filter element cleaner configured to flush the at least one filter, the filter element cleaner in fluidic communication with the at least one filter and in electrical communication with the detection system, wherein the detection system is configured to activate the filter element cleaner when the detection system determines that the at least one filter is clogged.

Additionally or alternatively, the at least one filter is a plurality of filters, and wherein the filter element cleaner is configured to provide flushing liquid to be selectively directed to a filter of the plurality of filters.

Additionally or alternatively, the filtration device further includes a second filter element having a second plurality of filters disposed thereon, the second filter element being mounted on the filter movement stage and having a first filter of the second plurality filters disposed in the fluidic flow path when the filtration device is in the first position, wherein the filter movement stage is configured to move the second filter element when the filtration device is in the second position to remove the first filter of the second plurality of filters out of the fluidic flow path and bring a second filter of the second plurality of filters into the fluidic flow path.

Additionally or alternatively, the movement stage is configured to move the first filter element and the second filter element substantially simultaneously.

Additionally or alternatively, the filter movement stage is configured to move the first filter element and the second filter element substantially independently.

Additionally or alternatively, the at least one filter is capable of chemical interactions with a chemical species in the fluid.

Additionally or alternatively, the at least one filter bears a non-zero electrical charge and wherein the housing further comprises one or more electrical leads electrically connected to one or more of the plurality of filters.

Additionally or alternatively, the at least one filter includes a pore size between about 0.2 µm and 50 µm and wherein the at least one filter includes a pore size standard deviation less than about 20% of the mean pore size.

Additionally or alternatively, the at least one filter is functionalized with an acidic functional group and bears a negative electrical charge.

Additionally or alternatively, the at least one filter is functionalized with an amine functional group and bears a positive electrical charge.

Additionally or alternatively, the at least one filter is a plurality of filters disposed in the fluidic flow path in series, wherein a first of the plurality of filters includes a first pore size, wherein a second of the plurality of filters includes a second pore size smaller than the first pore size, and where a third of the plurality of filters includes a third pore size smaller than the second pore size.

Additionally or alternatively, the portion of the fluidic flow path is comprised of multiple path segments each path segment having an inflow region and an outflow region, and one or more filters of the plurality of filters disposed between the inflow region and outflow region of each path segment, and wherein: the portion of the fluidic flow path comprises a first path segment having an inflow region in fluidic communication with the fluidic inlet; a last path segment having an outflow region in fluidic communication with the fluidic outlet; and the outflow region of an upstream path segment is in fluidic communication with the inflow region of a downstream path segment.

Additionally or alternatively, the housing further comprises: a flushing liquid manifold in fluidic communication with the portion of the fluidic flow path, the flushing liquid manifold connected to a flushing liquid inlet through a flushing valve; and a flushing liquid drain in fluidic communication with the portion of the fluidic flow path, wherein the flushing valve is configured to allow a flushing liquid to be selectively directed to a filter of the plurality of filters, wherein the flushing valve is configured to allow a flushing liquid to be selectively directed to a path segment of the multiple path segments.

In accordance with another embodiment, a liquid chromatography filtration device, comprises: a housing having a fluidic inlet, a fluidic outlet, wherein the housing is configured to be connected in line with a fluidic flow path of a liquid chromatography system such that at least a portion of the fluidic flow path is located between the fluidic inlet and the fluidic outlet; and at least one filter disposed in the portion of the fluidic flow path, wherein the at least one filter is made of a micromachined material.

Additionally or alternatively, where the filtration device further includes a detection system configured to automatically determine when the at least one filter is clogged.

Additionally or alternatively, the detection system includes a first pressure gauge located before the at least one filter in the fluidic flow path and a second pressure gauge located after the at least one filter in the fluidic flow path.

Additionally or alternatively, the filtration device further includes a filter element mounted on a filter movement stage, the filter movement stage in communication with the detection system, wherein a plurality of filters including the at least one filter is disposed on the filter element and wherein the filter movement stage is configured to move the filter element.

Additionally or alternatively, the filtration device further includes a dynamic sealing mechanism configured such that: when the filtration device is in a first position there is a fluidic seal between the filter element and the fluidic flow path such that fluid can flow from the fluidic inlet to the fluidic outlet through the filter element, and when the filtration device is in a second position the fluidic flow path is isolated from the filter element on both sides of the filter element.

Additionally or alternatively, the filter movement stage is configured to move the filter element when the filtration device is in the second position to automatically change the at least one filter disposed in the portion of the fluidic flow path with the second filter of the plurality of filters when the detection system determines that the at least one filter is clogged.

Additionally or alternatively, the filter element is a ribbon.

Additionally or alternatively, the filter element is a disc.

Additionally or alternatively, the filtration device further includes a filter element cleaner configured to flush the at least one filter, wherein the filter element cleaner is in fluidic communication with the at least one filter and in electrical communication with the detection system, wherein the detection system is configured to activate the filter element cleaner when the detection system determines that the at least one filter is clogged.

Additionally or alternatively, the at least one filter is a plurality of filters, and wherein the filter element cleaner is configured to provide flushing liquid to be selectively directed to a filter of the plurality of filters.

Additionally or alternatively, the filtration device further includes a second filter element having a second plurality of filters disposed thereon, the second filter element being mounted on the filter movement stage and having a first filter of the second plurality filters disposed in the fluidic flow path when the filtration device is in the first position, wherein the filter movement stage is configured to move the second filter element when the filtration device is in the second position to remove the first filter of the second plurality of filters out of the fluidic flow path and bring a second filter of the second plurality of filters into the fluidic flow path.

Additionally or alternatively, the movement stage is configured to move the first filter element and the second filter element substantially simultaneously.

Additionally or alternatively, the filter movement stage is configured to move the first filter element and the second filter element substantially independently.

Additionally or alternatively, the at least one filter is capable of chemical interactions with a chemical species in the fluid.

Additionally or alternatively, the at least one filter bears a non-zero electrical charge and wherein the housing further comprises one or more electrical leads electrically connected to the at least one filter.

Additionally or alternatively, the at least one filter includes a pore size between about 0.2 μm and 50 μm and wherein the at least one filter includes a pore size standard deviation less than about 20% of the mean pore size.

Additionally or alternatively, the at least one filter is functionalized with an acidic functional group and bears a negative electrical charge.

Additionally or alternatively, the at least one filter is functionalized with an amine functional group and bears a positive electrical charge.

Additionally or alternatively, the at least one filter is a plurality of filters disposed in the fluidic flow path in series, wherein a first of the plurality of filters includes a first pore size, wherein a second of the plurality of filters includes a second pore size smaller than the first pore size, and where a third of the plurality of filters includes a third pore size smaller than the second pore size.

Additionally or alternatively, the at least one filter is a plurality of filters and wherein the portion of the fluidic flow path is comprised of multiple path segments, each path segment having an inflow region and an outflow region, and at least one filter of the plurality of filters disposed between the inflow region and outflow region of each path segment, and wherein: the portion of the fluidic flow path comprises a first path segment having an inflow region in fluidic communication with the fluidic inlet; a last path segment having an outflow region in fluidic communication with the fluidic outlet; and the outflow region of an upstream path segment is in fluidic communication with the inflow region of a downstream path segment.

Additionally or alternatively, the housing further comprises: a flushing liquid manifold in fluidic communication with the portion of the fluidic flow path, the flushing liquid manifold connected to a flushing liquid inlet through a flushing valve; and a flushing liquid drain in fluidic communication with the portion of the fluidic flow path, wherein the flushing valve is configured to allow a flushing liquid to be selectively directed to a filter of the plurality of filters, wherein the flushing valve is configured to allow a flushing liquid to be selectively directed to a path segment of the multiple path segments.

In accordance with another embodiment, a liquid chromatography filtration method comprises: providing a fluidic flow path; providing a chromatography column located in the fluidic flow path; providing a filtration device located in the flow path before the chromatography column, the filtration device including: a housing having a fluidic inlet, a fluidic outlet, wherein the housing is configured to be connected in line with a fluidic flow path such that at least a portion of the fluidic flow path is located between the fluidic inlet and the fluidic outlet; and at least one filter disposed in the portion of the fluidic flow path, wherein the at least one filter is made of a micromachined material; and filtering fluid with the filtration device.

Additionally or alternatively, the filtration device further includes a detection system, and the method further comprises: determining, with the detection system, when the at least one filter is clogged.

Additionally or alternatively, the detection system includes a first pressure gauge located before the filtration device in the fluidic flow path and a second pressure gauge located after the filtration device in the fluidic flow path, and the method further comprises: detecting pressure with the first pressure gauge and the second pressure gauge, wherein the determining includes determining that a detected pressure difference between the first pressure gauge and the second pressure gauge is greater than a threshold.

Additionally or alternatively, the filtration device further includes a filter element mounted on a filter movement stage, the filter movement stage in communication with the detection system, wherein a plurality of filters including the at least one filter is disposed on the filter element, and the method further comprises: moving, with the filter movement stage, the filter element.

Additionally or alternatively, the filtration device further includes a dynamic sealing mechanism, and the method further includes: creating a fluidic seal between the filter element and the fluidic flow path with the dynamic sealing mechanism such that fluid can flow from the fluidic inlet to the fluidic outlet through the filter element; and isolating, with the dynamic sealing mechanism, the filter element from the fluidic flow path.

Additionally or alternatively, the method further includes moving when the filter element is isolated, with the filter movement stage, the filter element; and automatically changing, by the filter movement stage and the filter element, the at least one filter disposed in the portion of the fluidic flow path with the second filter of the plurality of filters when the detection system determines that the at least one filter is clogged.

Additionally or alternatively, the filter element is a ribbon.

Additionally or alternatively, the filter element is a disc.

Additionally or alternatively, the filtration device further includes a filter element cleaner in fluidic communication with the at least one filter and in electrical communication with the detection system, and the method further comprises: activating, with the detection system, the filter element cleaner when the detection system determines that the at least one filter is clogged; and flushing, with the filter element cleaner, the at least one filter after activation.

Additionally or alternatively, the at least one filter is a plurality of filters, and the method further comprises: selectively providing flushing liquid, by the filter element cleaner, to a filter of the plurality of filters.

Additionally or alternatively, the filtration device further includes a second filter element having a second plurality of filters disposed thereon, the second filter element being mounted on the filter movement stage and having a first filter of the second plurality filters disposed in the fluidic flow path when the filtration device is in the first position, and the method further comprises: moving, by the filter movement stage, the second filter element when the filter element is isolated; removing, by the filter movement stage, the first filter of the second plurality of filters out of the fluidic flow path; and bringing, by the filter movement stage, a second filter of the second plurality of filters into the fluidic flow path.

Additionally or alternatively, the method further includes moving, by the movement stage, the first filter element and the second filter element substantially simultaneously.

Additionally or alternatively, the method further includes moving, by the movement stage, the first filter element and the second filter element substantially independently.

Additionally or alternatively, the method further includes chemically interacting with a chemical species in the fluid by the at least one filter.

Additionally or alternatively, the at least one filter bears a non-zero electrical charge, and the method further includes connecting one or more electrical leads of the housing to one or more of the plurality of filters.

Additionally or alternatively, the at least one filter includes a pore size between about 0.2 μm and 50 μm and wherein the at least one filter includes a pore size standard deviation less than about 20% of the mean pore size.

Additionally or alternatively, the method further includes functionalizing the at least one filter with an acidic functional group and such that the at least one filter bears a negative electrical charge.

Additionally or alternatively, the method further includes functionalizing the at least one filter with an amine functional group such that the at least one filter bears a positive electrical charge.

Additionally or alternatively, the at least one filter is a plurality of filters, and the method further includes: disposing each of the plurality of filters in the fluidic flow path in series, wherein a first of the plurality of filters includes a first pore size, wherein a second of the plurality of filters includes a second pore size larger than the first pore size, and where a third of the plurality of filters includes a third pore size larger than the second pore size.

Additionally or alternatively, the at least one filter is a plurality of filters and wherein the portion of the fluidic flow path is comprised of multiple path segments, each path segment having an inflow region and an outflow region, and one or more filters of the plurality of filters disposed between the inflow region and outflow region of each path segment, and wherein: the portion of the fluidic flow path comprises a first path segment having an inflow region in fluidic communication with the fluidic inlet; a last path segment having an outflow region in fluidic communication with the fluidic outlet; and the outflow region of an upstream path segment is in fluidic communication with the inflow region of a downstream path segment.

Additionally or alternatively, the housing further comprises: a flushing liquid manifold in fluidic communication with the portion of the fluidic flow path, the flushing liquid manifold connected to a flushing liquid inlet through a flushing valve; and a flushing liquid drain in fluidic communication with the portion of the fluidic flow path, and the method further includes: selectively directing, by the flushing valve and the flushing liquid manifold, liquid to a filter of the plurality of filters; and selectively directing, by the flushing valve and the flushing liquid manifold, liquid to a path segment of the multiple path segments.

BRIEF DESCRIPTION OF THE DRAWINGS

The subject matter which is regarded as the invention is particularly pointed out and distinctly claimed in the claims at the conclusion of the specification. The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

FIG. 7 depicts a schematic of a gradient pump system for high pressure mixing, in accordance with embodiments of the present invention.

FIG. 8 depicts a schematic of a gradient pump system for low pressure mixing, in accordance with embodiments of the present invention.

DETAILED DESCRIPTION

A detailed description of the hereinafter described embodiments of the disclosed apparatus and method are presented herein by way of exemplification and not limitation with reference to the Figures. Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 1A:
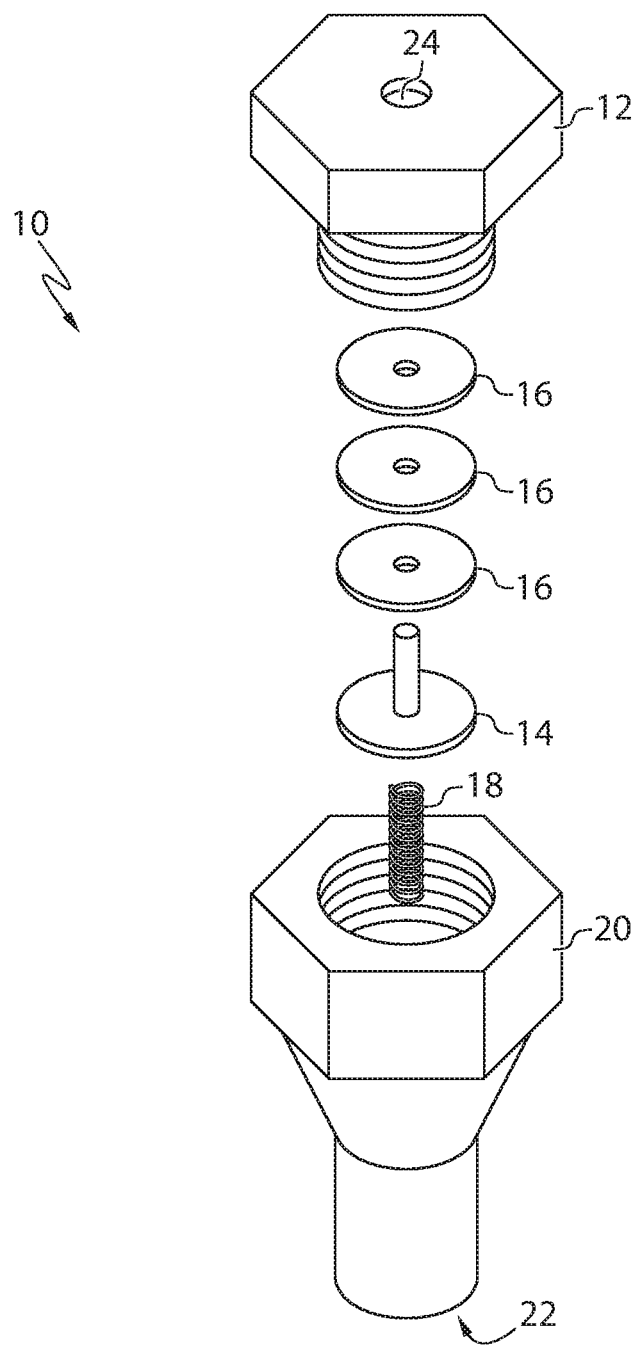
FIG. 1A depicts an exploded perspective view of a filtration device, in accordance with embodiments of the present inventions.

FIG. 1A depicts an exploded perspective view of a filtration device 10. The filtration device 10 includes a top fitting 12, a disk holder 14, a plurality of disk filters 16, a spring mechanism 18, and a lower body 20. The lower body 20 includes an inlet opening 22 through which a solvent or other fluid may enter into the filtration device 10. The top fitting 12 includes an outlet opening 24 through which the filtered solvent may exit the filtration device 10. The inlet opening 22 may be configured to facilitate a fluid tight seal connecting the lower body 20 to a fluidic coupling, fluidic assembly, line, tube, channel, passageway or the like. The outlet opening 24 may also be configured to facilitate a fluid tight seal connecting the top fitting 12 to a fluidic coupling, fluidic assembly, line, tube, channel, passageway or the like (not shown).

Figure 1B:
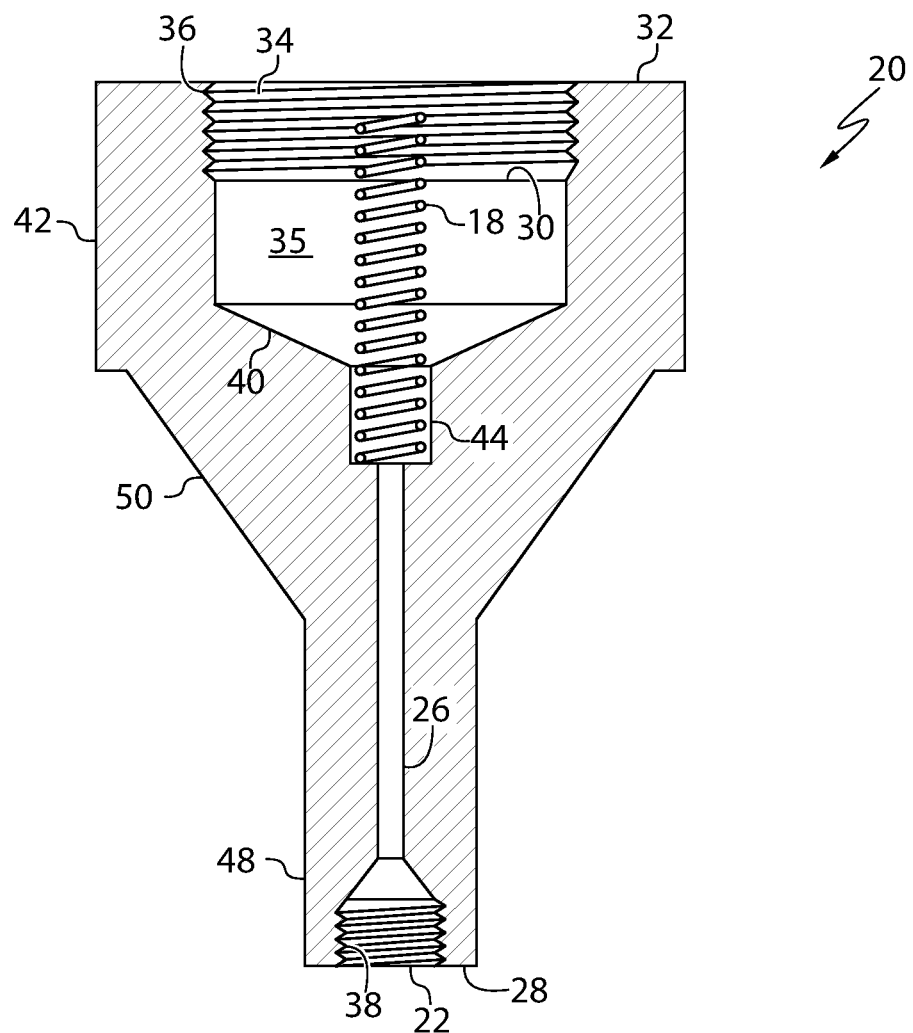
FIG. 1B depicts a side cutaway view of a lower body of the filtration device of FIG. 1A, in accordance with embodiments of the present inventions.

Referring to FIG. 1B, a side cutaway view of the lower body 20 is shown. The lower body 20 includes a fluidic passage 26 that extends between the inlet opening 22 at a first end 28 and a cavity 30 in a second end 32 of the lower body 20. The fluidic passage 26 may be a channel, tube, passageway, line, conduit or the like. The lower body 20 includes an internally threaded portion 38 extending into the inlet opening 22. The internally threaded portion 38 may be configured to receive a fluidic coupling fluidic assembly, line, tube, channel, passageway or the like (not shown) and thereby attach the filtration device 10 in line within an LC system. Other attachment mechanisms besides threads (not shown) are contemplated for attaching the filtration device 10 to an LC system.

The cavity 30 is shown including an upper portion 34 proximate the second end 32, and a lower portion 35 proximate the fluidic passage 26. The upper portion 34 of the cavity 30 includes internal threads 36 configured to provide for engagement with external threads 37 of the top fitting 12 (shown in FIG. 1E). The lower portion 35 of the cavity 30 is smooth and may be located proximate the plurality of disk filters 16 and the disk holder 14 when the filtration device 10 is assembled.

In the embodiment shown, the lower body 20 includes an expanding region 40 extending from the bottom of the cavity 30 toward the fluidic passage 26. The expanding region 40 is shown to have a conical shape and expands in cross sectional dimension as the region 40 approaches the second end 32 of the lower body 20 and contracts as the region 40 approaches the fluidic passage 26. The expanding region 40 may be configured to separate the flow of fluid coming from the fluidic passage 26 around the outside of the plurality of disk filters 16.

The lower body 20 includes a seating portion 44 between the fluidic passage 26 and the expanding region 40 for seating the spring mechanism 18. The seating portion 44 may have a depth such that the spring mechanism 18 sits within the seating portion 44 during assembly. The seating portion 44 includes a diameter larger than both the diameters of the fluidic passage 26 and the spring mechanism 18. The spring mechanism 18 may have a diameter larger than the fluidic passage 26 such that the spring mechanism 18 may be compressed between the seating portion 44 and the disk holder 14 after assembly of the filtration device 10.

The cavity 30 of the lower body 20 is dimensioned to receive the disk holder 14 and the plurality of disk filters 16. The cavity 30 includes a larger diameter than the diameter of each of the plurality of disk filters 16 and a bottom surface 46 (shown in FIG. 1D) of the disk holder 14 such that fluid may flow from the fluidic passage 26 around the outside of the bottom surface 46 of the disk holder 14 and between the plurality of disk filters 16 and the cavity 30. In embodiments where the cavity 30, the plurality of disk filters 16 and the disk holder 14 are non-circular, the cavity 30 may be dimensionally larger than the plurality of disk filters 16 and the disk holder 14 such that a fluid flow space is located between the cavity 30 and the plurality of disk filters 16 and the disk holder 14.

The outer wall of the lower body 20 is shown including a hexagonal region 42 that houses the expansive cavity 30. The hexagonal region 42 may also be octagonal, circular, square, rectangular, or the like and is not limited to a hexagonal outer shape. Further, the outer wall of the lower body 20 is shown including a narrow region 48 extending from the first end 28 and surrounding the fluidic passage 26. Located between the narrow region 48 and the hexagonal region 42 is an expanding region 50. Other shaped outer bodies are contemplated to house the plurality of disk filters 16 within.

While the inner cavity 30 is shown containing threads in order to assemble the lower body 20 with the top fitting 12, other assembly mechanisms are contemplated. For example, the lower body 20 may be attachable and detachable from the top fitting 12 by one or more attachment pins, a clamp mechanism, a press fit, screws, or the like. Whatever the embodiment, it may be desirable to provide a mechanism for assembly and disassembly of the filtration device 10 to expose the cavity 30 and facilitate the act of replacing the plurality of disk filters 16.

As shown in FIG. 1B, the spring mechanism 18 extends within the cavity 30 and has a larger dimension than the fluidic passage 26 of the lower body 20. The spring mechanism 18 may be compressed between the bottom (i.e. the seating portion 44) of the cavity 30 and the disk holder 14 when the filtration device 10 is assembled thereby biasing the disk holder 14 and the plurality of disk filters 16 upward against the top fitting 12. The spring mechanism 18 may be a helical spring having spaced apart coils such that fluid from within the spring mechanism 18 can transfer, flow, travel and/or migrate to outside the spring mechanism 18 and around the bottom surface 46 of the disk holder 14 and plurality of disk filters 16. The bottom surface 46 may include an indentation 66 (shown in FIG. 1D) which may be configured to receive an end of the spring mechanism 18.

In this manner, fluid may flow through the fluidic passage 26 and into the seating portion 44 within the spring mechanism 18. The fluid may then emerge from within the coils of the spring mechanism 18 and disperse around the non-porous bottom surface 46 of the disk holder 14 and the outside of the plurality of disk filters 16. The plurality of disk filters 16 may be configured to receive fluid in a radial direction from the outside of each disk toward the inside of the disk, thereby filtering the fluid that flows there through.

Figure 1C:
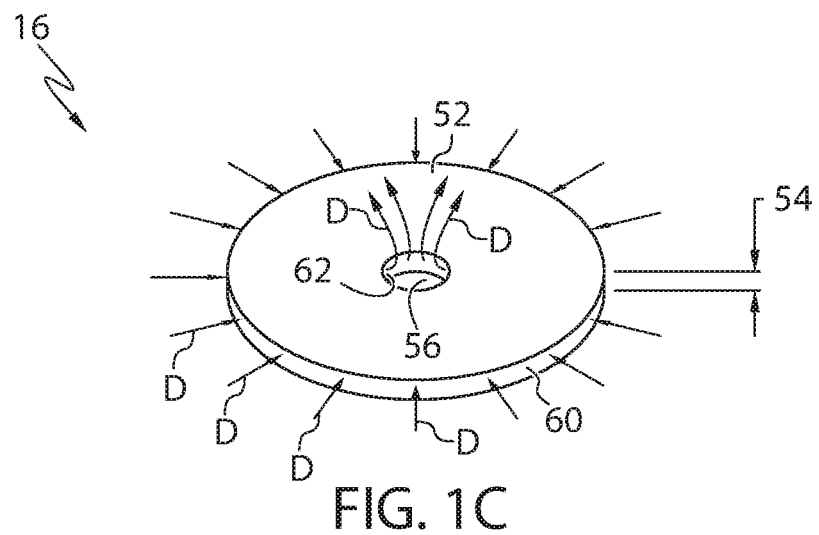
FIG. 1C depicts a perspective view of a filter of the filtration device of FIG. 1A, in accordance with embodiments of the present invention.

Shown in FIG. 1C is a perspective view of an exemplary one of the plurality of disk filters 16. The disk filter 16 includes a disk body 52 having a thickness 54 and an outer circumference that may be equal to a circumference of the bottom surface 46 of the disk holder 14. The disk filters 16 may include an inner opening 56 having a diameter that is larger than the diameter of a disk holder spindle 58 such that the disk filter 16 may be received onto the disk holder spindle 58. The disk body 52 may be configured to receive fluid in a flow direction D. The flow direction D may be through the disk body 52 from an outer circumferential wall 60 defined by the thickness 54, to an inner circumferential wall 62 also defined by the thickness 54. The disk body 52 shown is circular in shape. Other shapes are contemplated such as square, hexagonal, rectangular or the like.

A plurality of the disk filters 16 may be stacked together above the bottom surface 46 of the disk holder 14 onto the disk holder spindle 58. When stacked, fluid may be configured to flow from outside the outer circumferential walls 60 through the disk body 52 and out through the inner circumferential wall 62 and into openings 64 in the disk holder spindle 58.

The disk filter 16 may be made of a micromachined material using, for example, a 3-Dimensional micromachining process. In another embodiment, the disk filter 16 may be made of a plurality of stacked 2-Dimensional micromachined planar devices. The disk filter 16 may not be sintered, in one embodiment and may include a narrower distribution of pore size than a sintered filter. For example, the relative standard deviation of the pore size distribution for the disk filters 16 may be less than about 20% of the mean pore size. The disk filter 16 may be made from a semiconductor material and may include pores having a size within a predetermined narrow range. The disk filters 16 may, for example, incorporate technology described in U.S. Patent Application Publication No. 2014/0224658 (application Ser. No. 14/149,620) filed Jan. 7, 2014 of Imagine TF, LLC and U.S. Patent Application Publication No. 2016/0067634 (application Ser. No. 14/846,154) filed Sep. 4, 2015 of Imagine TF, LLC, which are hereby incorporated by reference.

Still further, a single coaxial tube shaped filter is contemplated that may be located onto the disk holder 14, rather than a plurality of disk filters 16. The single coaxial tube shaped filter may include an extended thickness relative to the thickness 54 of the disk filter 16 such that only a single filter may be required, rather than a stack of a plurality of filters. Still further, a plurality of tube filters may be disposed such that one tube filter is an outer tube that surrounds one or more inner tubes with increasingly smaller dimensions. Each of the plurality of tube filters may include different filter properties, such as porosity, materials, and the like.

While embodiments of the invention may include utilizing a filter made out of a micromachined material in liquid chromatography, there are additional inventive concepts described herein that are not limited in the material by which the filter is made. Thus, in some embodiments described, sintered filters may be adopted or incorporated.

In embodiments contemplated, one or more of the plurality of disk filters 16 may be capable of ion exchange. One or more of the plurality of disk filters 16 may additionally or alternatively be chemically reactive. One or more of the plurality of disk filters 16 may additionally or alternatively bear a non-zero electrical charge. Further, one or more of the plurality of disk filters 16 may be capable of chemical interactions with one or more chemical species within the fluid. The filtration device 10 may include one or more electrical leads connected to one or more of the plurality of filters 16. In one embodiment, one or more of the plurality of disk filters 16 is functionalized with an amine functional group that bears a positive electrical charge. In another embodiment, one or more of the plurality of disk filters 16 is functionalized with an acidic functional group that bears a negative electrical charge. In one embodiment, one or more of the plurality of disk filters 16 may be charged to attract particulates of opposite polarity. Other coatings are contemplated for one or more of the plurality of disk filters 16 such as an inert coating to prevent particulates from sticking. A silver coating may further be advantageous for its antibacterial properties for preventing bacterial growth on the filter.

The plurality of disk filters 16 may each have a thickness between about 0.2 mm and about 10 mm, an average pore size between about 0.2 µm and about 50 µm, and the relative standard deviation of the pore size distribution is less than about 20% of the mean pore size. In other embodiments, the relative standard deviation of the pore size distribution may be less than about 10% of the mean pore size. In one embodiment, each of the plurality of disk filters 16 in the filtration device 10 may have the same properties. In other embodiments (such as those described below), a plurality of disk filters may be used having different properties.

Figure 1D:
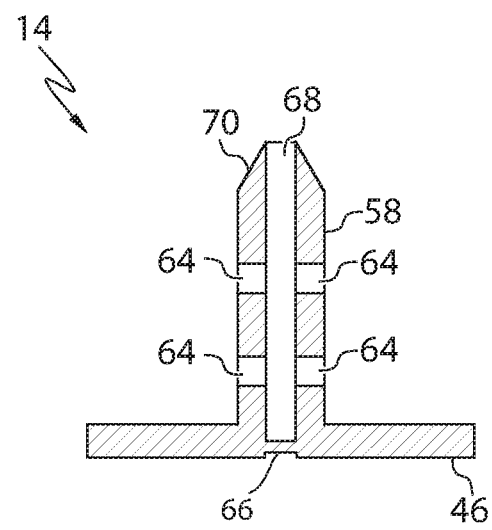
FIG. 1D depicts a side cutaway view of disk holder of the filtration device of FIG. 1A, in accordance with embodiments of the present inventions.

FIG. 1D shows a side cutaway view of the disk holder 14. The disk holder 14 includes the bottom surface 46. The bottom surface 46 may be circular in shape and have a thickness such that the bottom surface 46 does not allow fluid to absorb or pass through. The bottom surface 46 may be nonporous. In the embodiment shown, the bottom surface 46 has a similar or the same outer radius as the outer radius of the disk filter 16. The bottom surface 46 is circular and corresponds to the dimensions of the disk holder 14. The lower face of the bottom surface 46 may include a notch 66. The notch 66 may be an indent, bore, hole, opening or the like in order to receive the spring mechanism 18.

The disk holder 14 further includes the disk holder spindle 58 extending from the bottom surface 46 upward toward the top fitting 12. The disk holder spindle 58 is a hollow projection, tube, cylinder or the like. The disk holder spindle 58 has a middle channel or fluid path 68. The disk holder spindle 58 further includes a plurality of openings 64 disposed along its height. The plurality of openings 64 may be configured to receive fluid there through from the plurality of disk filters 16 when disposed on the disk holder 14. In one embodiment, the disk holder spindle 58 may not include the plurality of openings 64 but may instead be made from a porous material configured to receive fluid there through. The disk holder spindle 58 includes a narrow tip 70. The narrow tip 70 may be configured to be seated into a corresponding opening 72 in the bottom end 74 of the top fitting 12.

Figure 1E:
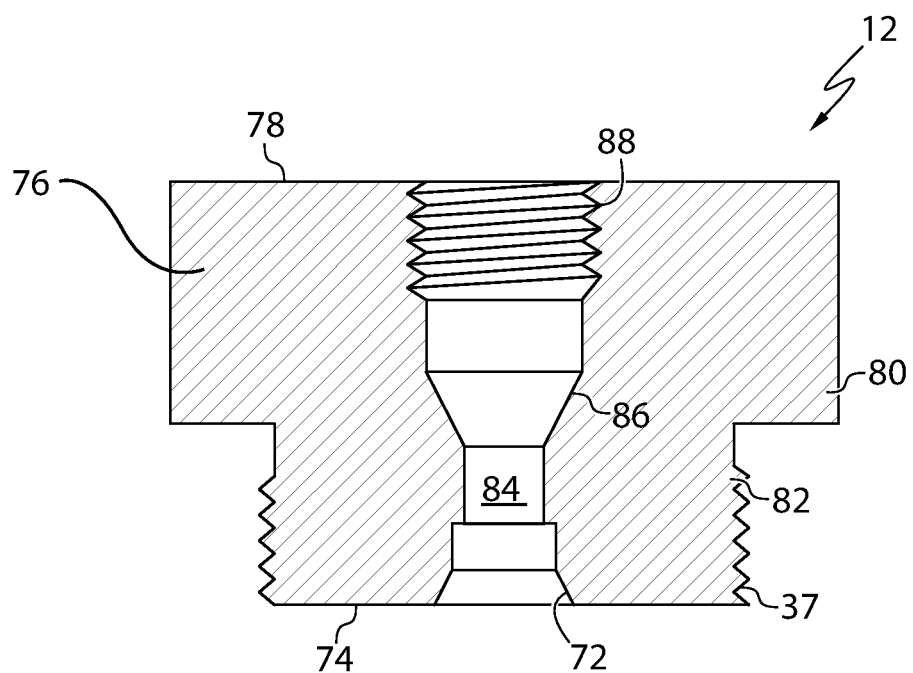
FIG. 1E depicts a side cutaway view of a top fitting of the filtration device of FIG. 1A, in accordance with embodiments of the present inventions.

FIG. 1E shows a side cutaway view of the top fitting 12 of the filtration device 10. The top fitting includes a main body 76 having a top end 78 and the bottom end 74. The top end 78 includes a hexagonally shaped upper portion 80 and a lower portion 82 having the external threads 37. The hexagonally shaped upper portion 80 may be configured to facilitate rotation of the top fitting 12 about the lower body 20 such that the external threads 37 of the top fitting 12 engage with the internal threads 36 of the lower body 20 to attach and assemble the filtration device 10.

The top fitting 12 includes a fluidic passage 84. The fluidic passage 84 includes the opening 72 configured to receive the narrow tip 70 of the disk holder spindle 58. The fluidic passage 84 further includes a channel portion extending between the opening 72 and an expanding portion 86. The expanding portion 86 may expand to an internally threaded portion 88. The internally threaded portion 88 may extend to the outlet opening 24 of the filtration device 10. The internally threaded portion 88 may be configured to facilitate a fluid tight seal connecting the top fitting 12 to a fluidic coupling, fluidic assembly, line, tube, channel, passageway or the like (not shown). The shape and dimensions of 84, 86, and 88 may be compatible with commercially available fittings.

When installed, the spring mechanism 18 is disposed between the lower body 20 and the disk holder 14 biasing the disk holder 14 upwards against the top fitting 12. The fluid, such as a solvent or the like may be configured to enter the filtration device 10 through the inlet opening 22 and emerge from the outlet opening 24 after being forced through at least one of the plurality of disk filters 16 from the outer circumference wall 60 to the inner circumference wall 62 and upwards through the disk holder spindle 58 to the top fitting 12

Figure 2:
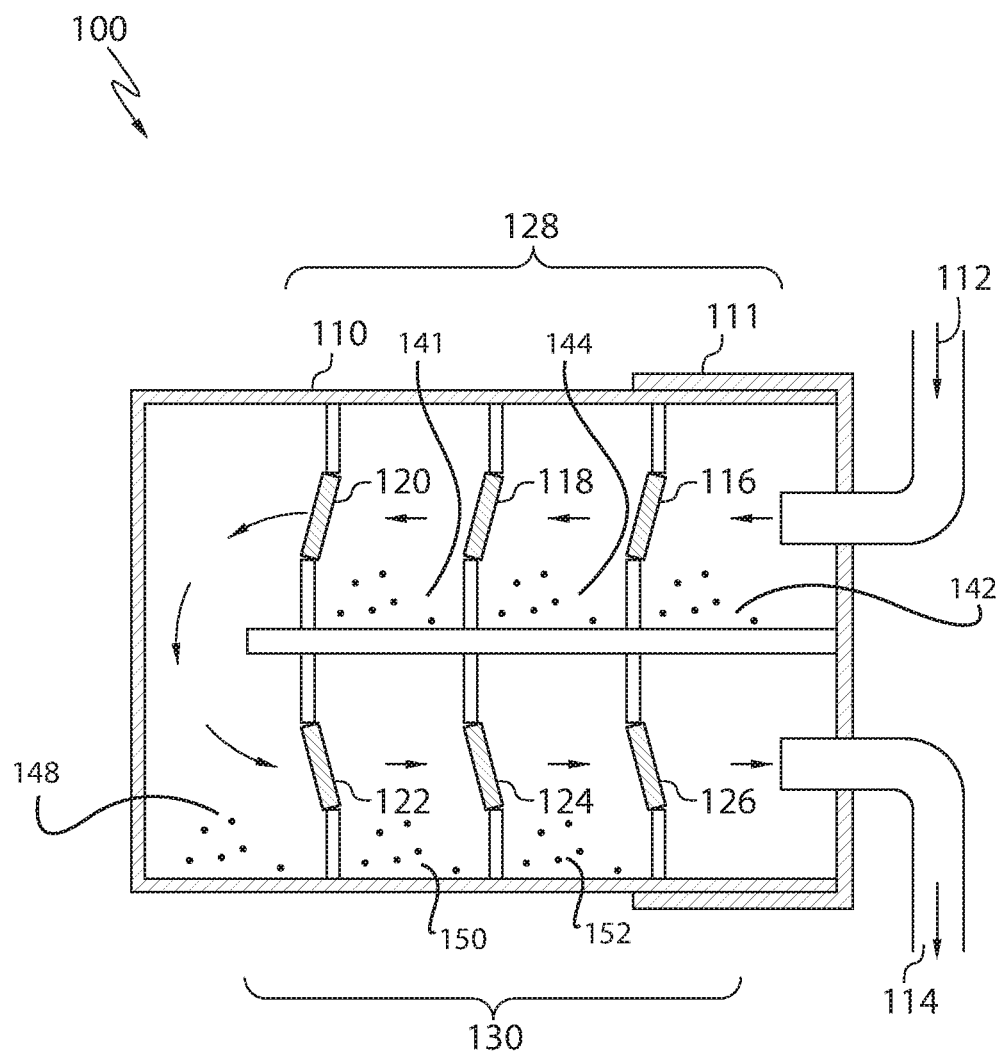
FIG. 2 depicts a schematic view of a filtration device, in accordance with embodiments of the present invention.

FIG. 2 depicts a schematic view of a filtration device 100, in accordance with embodiments of the present invention. The filtration device 100 may include a housing 110 having a fluid inlet 112 and a fluid outlet 114. The housing 110 may be an assembly that may be unassembled in order to expose and change filters. The housing 110 may include a removable portion 111 to provide for disassembly of the filtration device 100. The filtration device 100 may include a plurality of filters connected in series: a first filter 116, a second filter 118, a third filter 120, a fourth filter 122, a fifth filter 124, and a sixth filter 126. The filters 116, 118, 120, 122, 124, 126 may each be micromachined and not sintered and may share some or all of the structure described hereinabove with respect to the plurality of disk filters 16. In other embodiments, one or more of the filters 116, 118, 120, 122, 124, 126 may be traditional sintered filters.

In use, fluid may arrive at the filtration device 100 at the fluid inlet 112. The fluid may travel through each of the filters 116, 118, 120, 122, 124, 126 in succession or one at a time in the order shown: first through the first filter 116, then through the second filter 118, then through the third filter 120, then through the fourth filter 122, then through the fifth filter 124, and finally through the sixth filter 126 before exiting the filtration device 100 through the fluid outlet 114.

Each of the filters 116, 118, 120, 122, 124, 126 may include a different pore size. The pore sizes may get smaller with each successive filter in the line. Thus, the largest particles are screened at the first filter 116 having the largest pore size and the smallest particles are screened at the sixth filter 126. This may increase the screening efficiency while preserving the overall device permeability during the lifetime of each of the filters 116, 118, 120, 122, 124, 126. As shown, the successive filters 116, 118, 120, 122, 124, 126 are each placed in the single housing 110 with a single chamber. In other embodiments, the housing 110 may include multiple openings or chambers, each configured to receive one of the filters 116, 118, 120, 122, 124, 126, and each of the chambers fluidically connected in series.

In the embodiment shown, each of the six filters 116, 118, 120, 122, 124, 126 may include successively smaller pore sizes. The range of pore sizes may be greater than or equal to 0.2 um and less than or equal to 50 um, in one embodiment. In other embodiments, multiple successive filters may each include the same pore size. For example, the first and second filters 116, 118 may have an equal pore size, the third and fourth filters 120, 122 may have an equal pore size that is smaller than the first and second filters 116, 118, and the fifth and sixth filters 124, 126 may have an equal pore size that is smaller than the third and fourth filters 120, 122. While the embodiment shown includes the six filters 116, 118, 120, 122, 124, 126, other embodiments are contemplated having more or less than six filters. For example, other embodiments (described below) may have three successive filters. Ten or more filters are also contemplated.

As shown, the filters 116, 118, 120, 122, 124, 126 are oriented at an angle such that larger particles 140 that do not fit through the filters are configured to drop off the filter and rest in chambers 142, 144, 146, 148, 150, 152 located behind the respective filters 116, 118, 120, 122, 124, 126. In one embodiment, this angle may not be perpendicular from the general fluid flow of the filtration device 100. The filters 116, 118, 120, 122, 124, 126 can comprise various shapes. While the shown embodiment may be an angled plate, other embodiments may include a sphere, a cone, a cup, or the like.

Figure 3A:
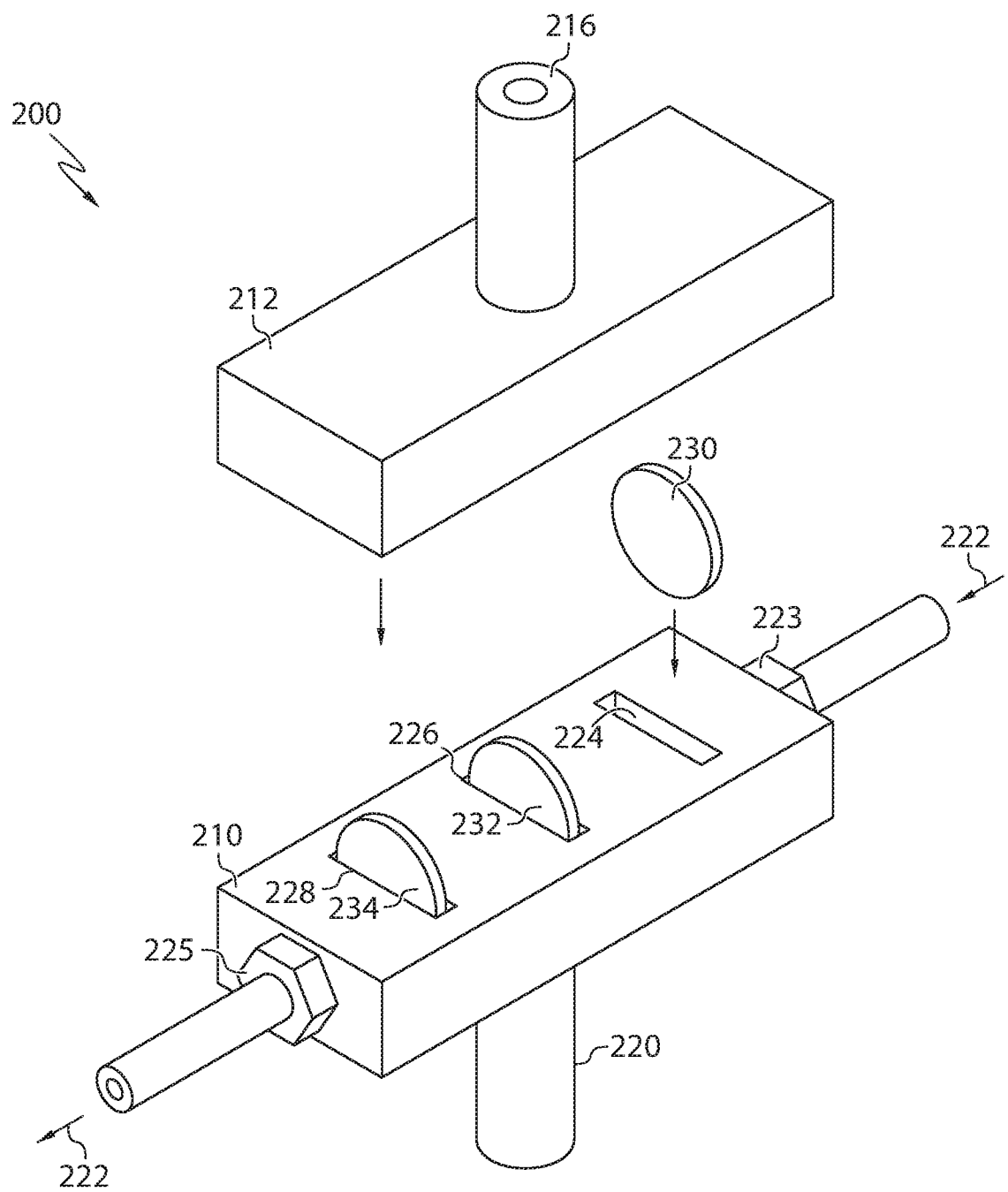
FIG. 3A depicts a perspective view of a filtration device with a removed cover, in accordance with embodiments of the present invention.

FIG. 3A depicts a perspective view of a filtration device 200 with a main body 210 and a removable cover 212 (shown removed), in accordance with embodiments of the present invention. The main body 210 of the filtration device 200 includes three openings 224, 226, 228 configured to correspondingly receive three filters 230, 232, 234. In other embodiments, the main body 210 of the filtration device 200 may include more or less than three filters. For example, the main body 210 may include 1 or more filters. The removable cover 212 may be removed to expose the filters 230, 232, 234 such that replacement is possible. The filters 230, 232 234 may be arranged in a fluid path 222 configured to receive fluid, such as a solvent, there through in a similar or the same manner to the filtration devices 10, 100 described herein above. Fluid may enter the filtration device 200 through a fluid inlet 223. Within the main body 210, the fluid may travel through a fluid path, channel, tube, passageway, line, conduit, or the like, through each of the filters 230, 232, 234. Similar to the filtration device 100 described herein above, the filters 230, 232, 234 may be arranged in series along the fluid path such that the fluid passes through the first filter 230, then the second filter 232, then the third filter 234.

The filters 230, 232, 234 may have similar or the same properties to those described hereinabove with respect to the filters 16, 116, 118, 120, 122, 124, 126. As described above, it may be advantageous for the filters 230, 232, 234 to have different pore sizes, coatings and the like. In one embodiment, the pore size of the first filter 230 may be, for example, about 10 µm. The pore size of the second filter 232 may be, for example, about 2 µm. The pore size of the third filter 234 may be, for example, about 0.5 µm. While the filtration device 200 includes three filters as shown, other embodiments are contemplated such as the six filter filtration device 100 described above. Any number of filters may be included in the filtration device 200.

Figure 3B:
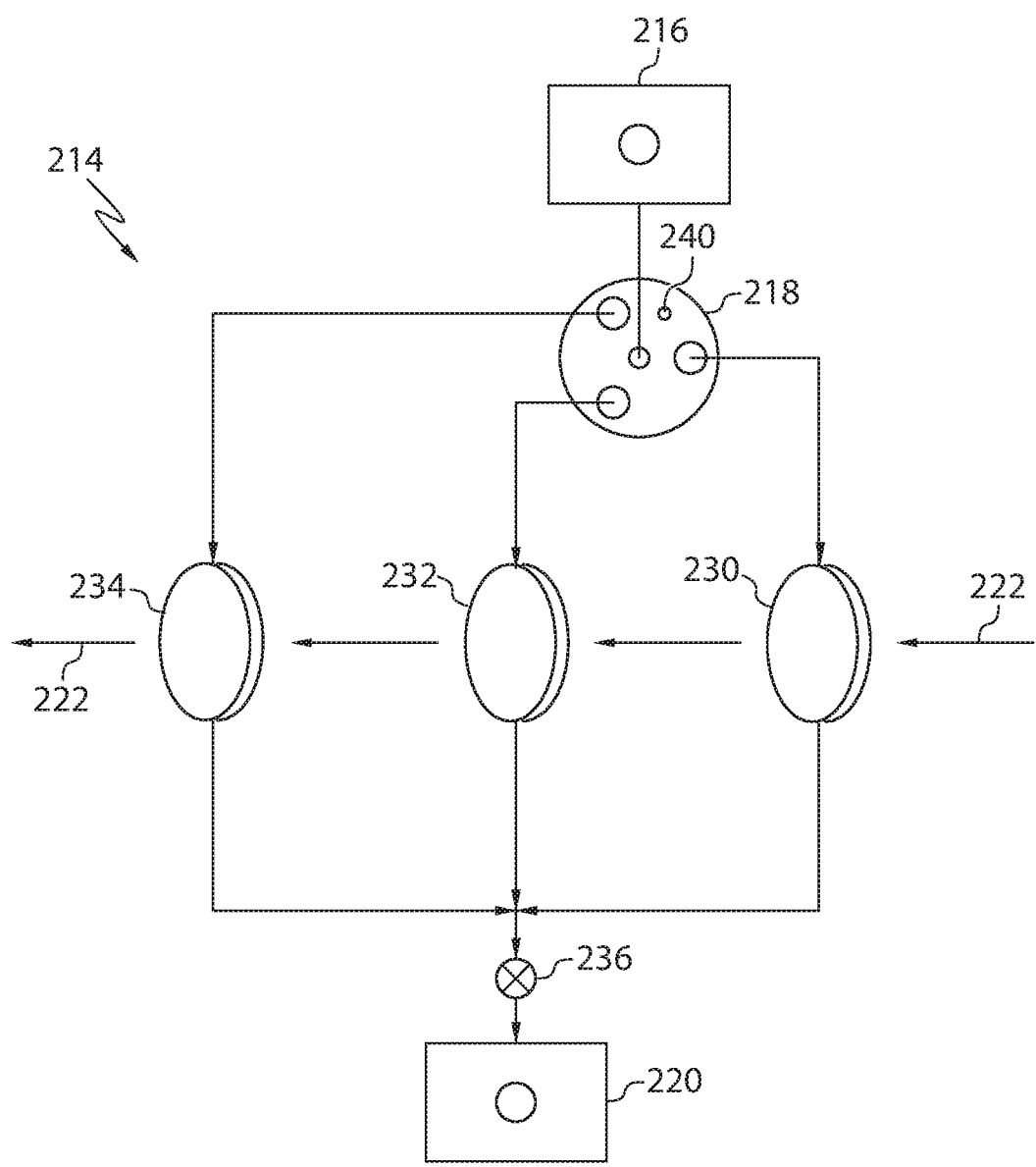
FIG. 3B depicts a schematic view of a manifold of the filtration device of FIG. 3A, in accordance with embodiments of the present invention.

Shown in FIG. 3B is a schematic of a flushing liquid manifold 214 of the filtration device 200. The flushing liquid manifold 214 includes a flushing liquid inlet 216, a flushing valve 218, a flushing liquid drain valve 236, and a flushing liquid drain port 220. When the flushing valve 218 is opened, the flushing liquid manifold 214 is configured to move a flushing liquid, such as water or the like, from the flushing liquid inlet 216 through the flushing valve 218 and through at least a portion of a fluid or solvent flow path 222 of a LC system, and out the flushing liquid drain 220. The flushing valve 218 may be configured to selectively direct water to clean each of the plurality of filters 230, 232, 234. In other embodiments, the flushing valve 218 may direct flushing water through each filter simultaneously. The flushing valve may include a dead end port 240 that may prevent flow when the filtration device 200 is not in flushing mode. In one embodiment, the flushing liquid manifold 214 is configured to direct water through each of the filters 230, 232, 234 in the reverse direction from the fluid path 222. In another embodiment, the flushing liquid manifold 214 is configured to direct flushing water perpendicular to the fluid path 222. In another embodiment, the filtration device 200 may be configured for flow reversal through the fluid path 222 in order to flush the filters 230, 232, 234. It is also possible to clean the filters 230, 232, 234 through manual removal from the openings 224, 226, 228 and manual washing the filters 230, 232, 234 with running water.

The filtration device 200 may be a smart device and may include sensors configured to detect whether the filters 230, 232, 234 are becoming clogged, less effective, or less efficient. In one embodiment, sensors located in the main body 210 of the filtration device 200 determine when to flush the filters 230, 232, 234 by opening the valves 218, 236 and running a flushing routine. The filtration device 200 may automatically run a flushing routine when the sensors detect the filters 230, 232, 234 are dirty, clogged, or need flushing. Sensors may include pressure sensors located before and after the filters to determine the pressure in the fluidic flow path 222.

Figure 4:
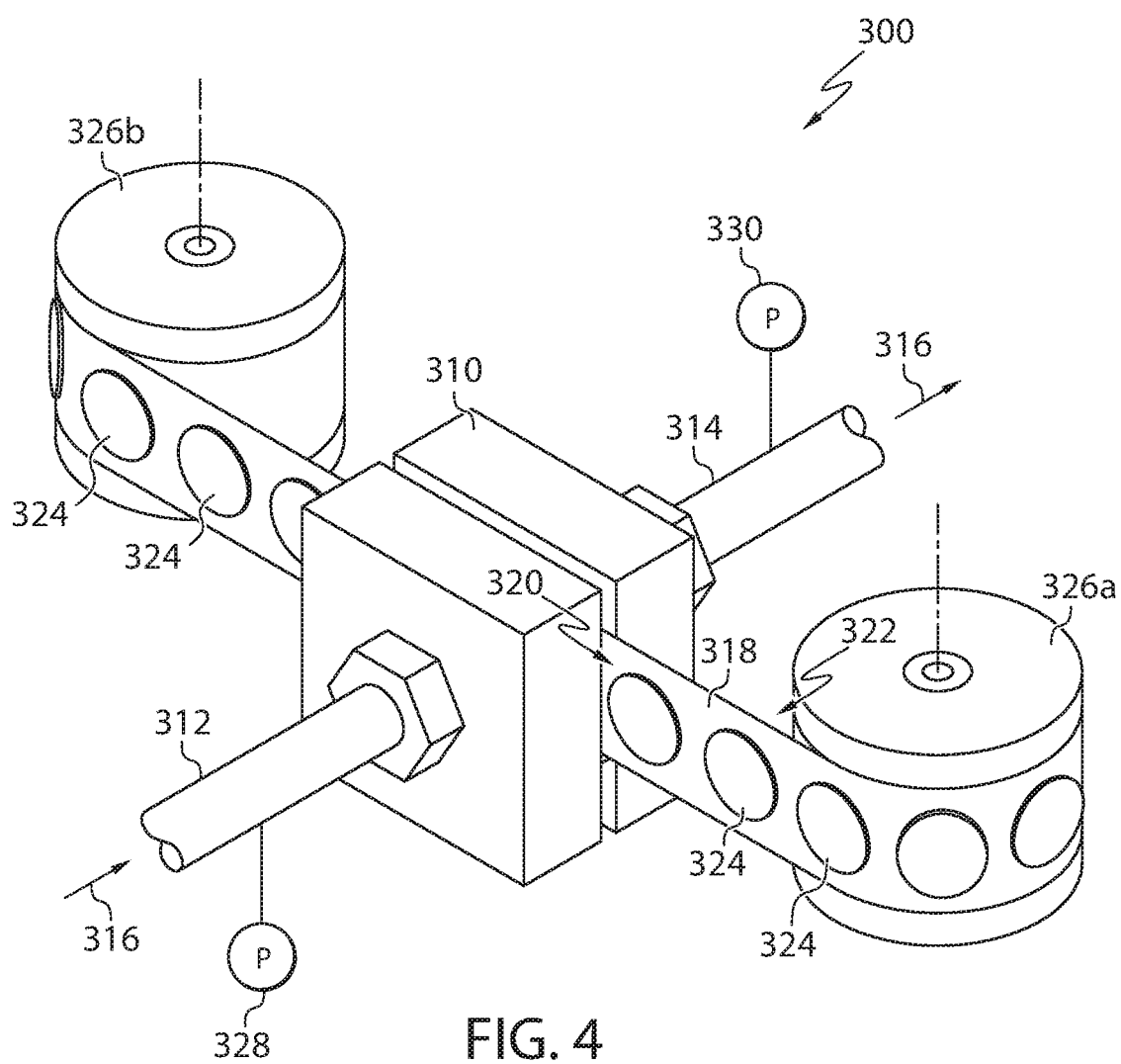
FIG. 4 depicts a perspective view of a filtration device, in accordance with embodiments of the present invention.

FIG. 4 depicts a perspective view of another filtration device 300, in accordance with embodiments of the present invention. The filtration device 300 includes a housing 310 having a fluidic inlet 312, a fluidic outlet 314, and a fluidic flow path 316 between the fluidic inlet 312 and the fluidic outlet 314. The filtration device 300 includes a filter element 318 having a first side 320 and a second side 322 and a plurality of filters 324 attached, mounted to, in line with, or otherwise disposed onto the filter element 318. The filter element 318 is shown in FIG. 4 to be a ribbon. In one embodiment, the filter element 318 may be made of a flexible plastic material. In other embodiments, the filter element 318 may include ends made of a more flexible material (to provide for rotation and movement of the ribbon) but an inflexible center location that holds the plurality of filters 324. In another embodiment, the filter element 318 may be a flexible filter ribbon, indistinguishable from filters 324.

The filter element 318 is mounted on a filter movement stage that comprises two rotatable cylinders 326a, 326b. The filter movement stage 326a, 326b may be configured to move the plurality of filters 324 such that a first of the filters 324 is within the fluidic flow path 316 when one or more of the filter movement stage 326a, 326b, the filter element 318 and the filtration device 300 is in a first position (as shown). The filter movement stage 326a, 326b may be configured to move the plurality of filters 324 such that in a second position, the first filter 324 is not in the fluidic flow path 316 but rather a second of the plurality of filters 324 on the filter element 318 is in the fluidic flow path 316.

Within the housing 310 may be included a dynamic sealing mechanism configured to provide a fluidic seal between the filters 324 of the filter element 318 and the fluidic flow path 316 such that fluid can flow from the fluidic inlet 312 to the fluidic outlet 314 through the first filter 324. A fluid tight seal may be created by the housing when the filter 324 is in position. In the embodiment shown, the first cylinder 326a may be configured to rotate clockwise to release the filter element 318 while the second cylinder 326b may be simultaneously configured to rotate clockwise to reel the filter element 318. In this manner, rotation of the cylinders 326a, 326b may be configured to feed the filter element 318 through the housing 310 into position within the fluidic flow path 316.

The filters 324 may each have similar or the same properties to those described hereinabove with respect to the filters 16, 116, 118, 120, 122, 124, 126, 230, 232, 234. Thus, the filters may be porous and may be micromachined rather than sintered. As described above, it may be advantageous for the filters 324 to have different pore sizes, coatings and the like. In one embodiment, the filters 324 may each have the same pore size. The exchange or replacement of active filters in the fluidic flow path 316 by the cylinders 326a, 326b of the filter movement stage may be done in order to place a new and clean filter 324 in the fluidic flow path 316 when a used filter 324 is dirty or clogged.

In the embodiment shown, a first pressure gage 328 is located in the fluidic flow path 316 prior to the housing 310 and the filters 324. A second pressure gage 330 is located in the fluidic flow path 316 after the housing 310 and the filters 324. The pressure gages 328, 330 are shown outside the housing 310 but in other embodiments, the pressure gages 328, 330 may be housed within the housing 310. The pressure gages 328, 330 may be configured to detect fluid pressure in the fluidic flow path 316 before and after the filtration by the filtering device 300. These detected pressure values may facilitate determining whether the particular filter 324 located in the fluidic flow path 316 is dirty or clogged. A pressure change that is above a threshold may indicate a clogged filter. In one embodiment, the pressure gauges 328, 330 may be electrically connected to the filtration device 300. The filtration device 300 may include a computer, processor, or may be connected to a remote computer or processor, that can use the information provided by the pressure gauges 328, 330 in order to determine whether a new filter 324 is needed. If it is determined by the computer processor that a new filter is needed, the filtration device 300 may be configured to automatically rotate the cylinders 326a, 326b to move the ribbon of the filter element 318 and automatically move a new filter 324 in line with the fluidic flow path 316. In one embodiment, additional sensors than the pressure gauges 328, 330 may be included to determine whether a filter needs to be changed, such as flow velocity sensors, or the like. These sensors may be located within or outside the housing 310.

In one embodiment, a plurality of filtration devices 300 may be placed in the fluidic flow path 316, each of the plurality of filtration devices 300 including filters of varying porosities and properties. In other embodiments, the filtration device 300 may include two or more filter elements, such as the filter element 318. Each additional filter element 318 may extend through its own opening in the housing 310 to pass through the fluidic flow path 316. Each additional filter element 318 may include its own cylinders and filter movement stage. In another embodiment, a single filter movement stage may be configured to receive multiple filter elements 318. The filter movement stage may be configured to move each filter element of the system substantially simultaneously in one embodiment. In another embodiment, the filter movement stage may be configured to move each filter element in the system substantially independently.

In still another embodiment, the filter movement stage may include a cleaning mechanism positioned to receive filters 324 after they have been removed from the fluidic flow path 316. The cleaning mechanism may expose the dirty or used filters 324 to water after being removed from the fluidic flow path 316. In one embodiment, one or both of the cylinders 326a, 326b may include a cleaning mechanism.

Figure 5:
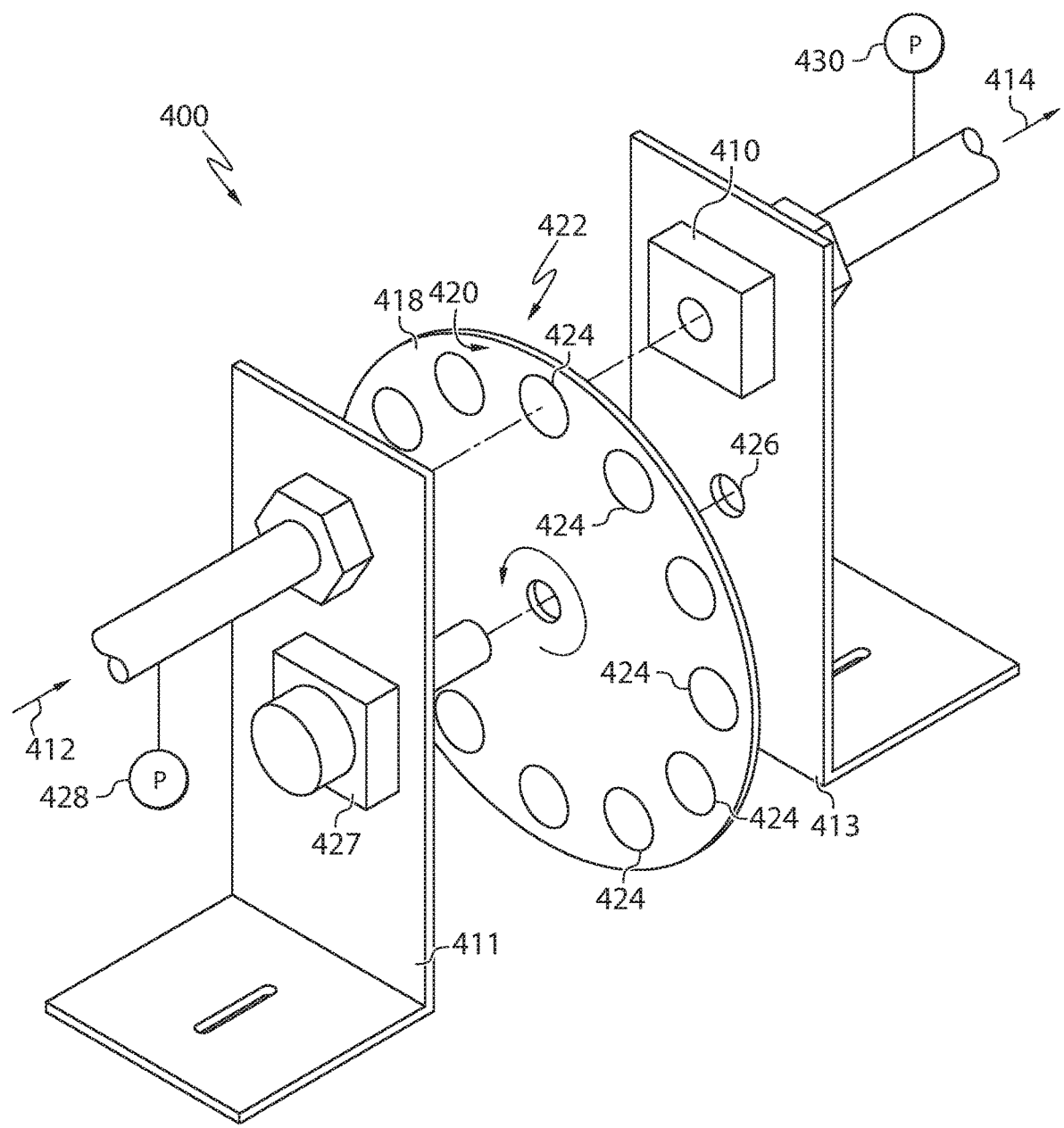
FIG. 5 depicts a perspective view of a filtration device, in accordance with embodiments of the present invention.

FIG. 5 depicts a perspective view of another filtration device 400, in accordance with embodiments of the present invention. The filtration device 400 may be similar to the filtration device 300 but instead of the ribbon and cylinder arrangement for the filter element, the filtration device 400 includes a disk shaped filter element 418. The filtration device 400 may include a first mount 411 and a second mount 413 that may be configured to be slideable and/or pressed together to form a fluid tight seal with the disk shaped filter element 418 located between.

The filtration device 400 includes a fluidic inlet 412, a fluidic outlet 414, and a fluidic flow path 416 between the fluidic inlet 412 and the fluidic outlet 414. The filtration device 400 includes the disk shaped filter element 418 having a first side 420 and a second side 422 and a plurality of filters 424 attached, mounted to, in line with, or otherwise disposed onto the disk shaped filter element 418. In one embodiment, the disk shaped filter element 418 may be made of a plastic material. In another embodiment, the disk shaped filter element 418 may be the filter itself.

The disk shaped filter element 418 may be mounted on a mounting structure 426 such that the circle defined by the disk shaped filter element 418 has a center that is spaced apart from the axis of the fluidic flow path 416. The mounting structure 426 may be an axis configured to receive the disk shaped filter element 418 defined by a pin or projection located in one or both of the first mount 411 and the second mount 413 defining the axis. Whatever the embodiment, the disk shaped filter element 418 may be rotatable about the mounting structure 426 between the first and second mounts 411, 413. A motor or other filter movement stage 427 may be configured to move exact rotation on the disk shaped filter element 418 in order to put a first of the filters 424 within the fluidic flow path 416 when one or more of the filter movement stage 427, the disk shaped filter element 418 and the filtration device 400 is in a first position (as shown). The filter movement stage 427 may be configured to move the plurality of filters 424 such that in a second position, the first filter 424 is not in the fluidic flow path 416 but rather a second of the plurality of filters 424 on the filter element 418 is in the fluidic flow path 416.

The filtration device 400 may include housings 410 attached to each of the first mount 411 and the second mount 413, one being shown attached to the second mount 413, the other being hidden in the view shown. Within the housings 410 bet may be included a dynamic sealing mechanism configured to provide a fluidic seal between the filters 424 of the filter element 418 and the fluidic flow path 416 such that fluid can flow from the fluidic inlet 412 to the fluidic outlet 414 through the first filter 424. A fluid tight seal may be created by the housing 410 when the filter 424 is in position and the first mount 411 and the second mount 413 become slidably engaged.

The filters 424 may each have similar or the same properties to those described hereinabove with respect to the filters 16, 116, 118, 120, 122, 124, 126, 230, 232, 234, 324. Thus, the filters may be porous and may be micromachined rather than sintered. As described above, it may be advantageous for the filters 424 to have different pore sizes, coatings and the like. In one embodiment, the filters 424 may each have the same pore size. The exchange or replacement of active filters in the fluidic flow path 416 by rotating the disk shaped filter element 418 may be done in order to place a new and clean filter 424 in the fluidic flow path 416 when a used filter 424 is dirty or clogged.

As described hereinabove with respect to the filtration device 300, the filtration device 400 may include pressure sensors on each side of the filter, and may include other sensors, and may include the ability to automatically detect when the active filter needs to be changed. Further, the filtration device 400 may include a cleaning mechanism for cleaning a filter after it has been moved from the fluidic flow path 416 as described hereinabove.

In one embodiment, a plurality of the filtration devices 400 may be placed in the fluidic flow path 416, each of the plurality of filtration devices 400 including filters of varying porosities and properties. In other embodiments, the filtration device 400 may include a two or more disk shaped filter elements located next to each other along the same rotatable axis. Each additional disk shaped filter element 418 may include its own filter movement stage 427. In another embodiment, a single filter movement stage 427 may be configured to receive multiple filter elements 418. The filter movement stage(s) may be configured to move each disk shaped filter element of the system substantially simultaneously in one embodiment. In another embodiment, the filter movement stage(s) may be configured to move each disk shaped filter element in the system substantially independently.

Figure 6A:
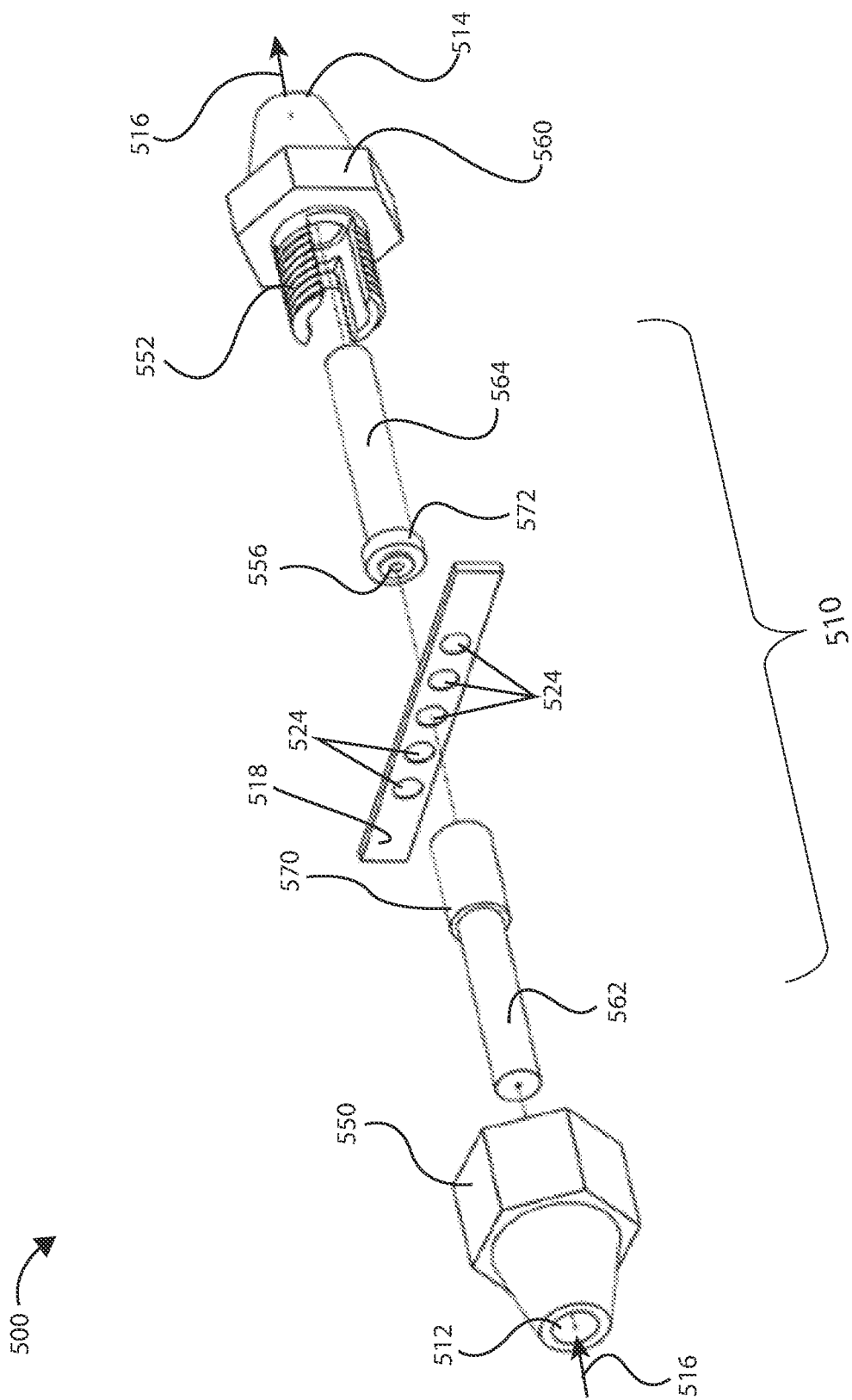
FIG. 6A depicts an exploded perspective view of a filtration device, in accordance with embodiments of the present invention.
Figure 6B:
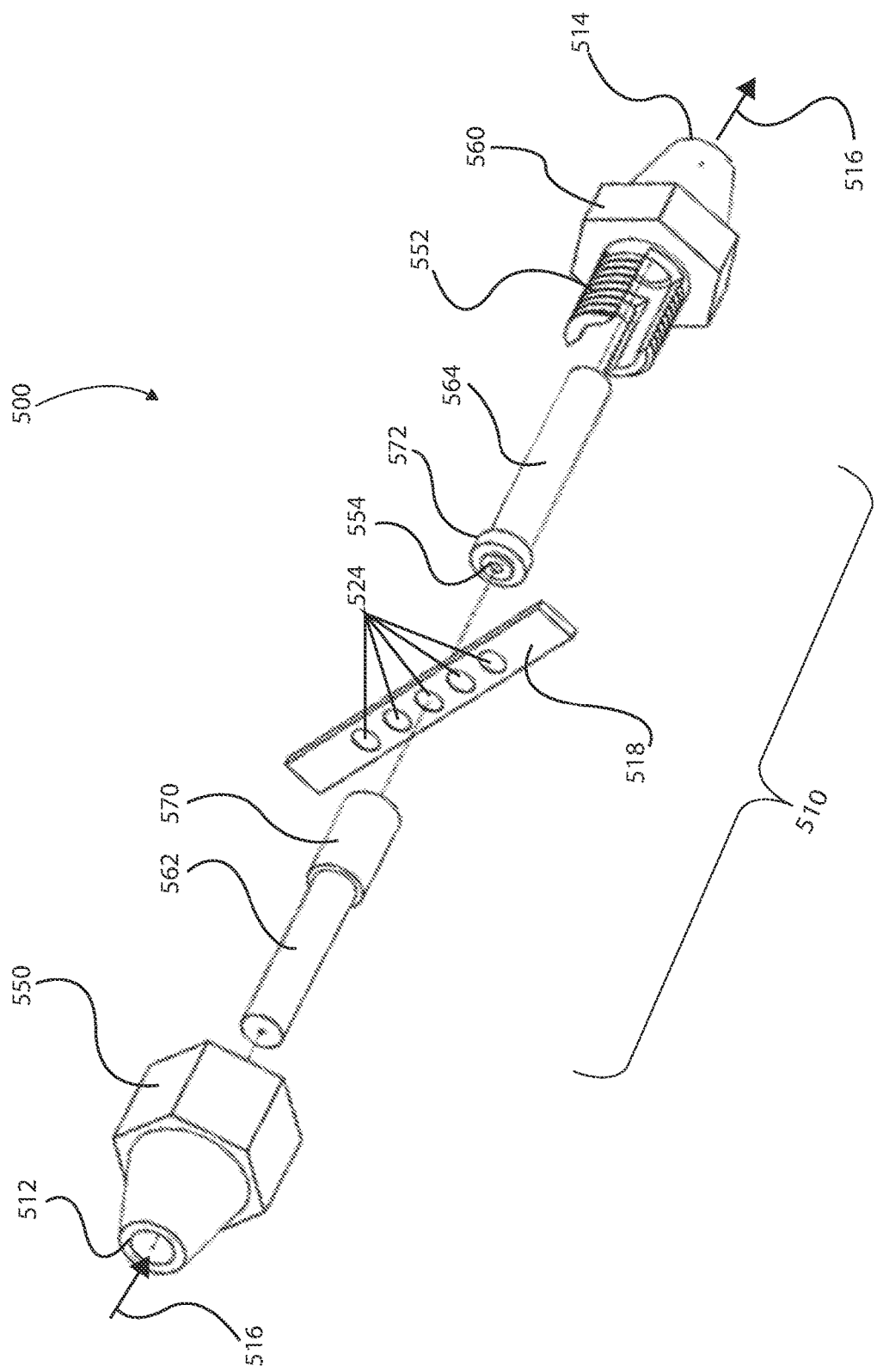
FIG. 6B depicts another exploded perspective view of the filtration device of FIG. 6A, in accordance with embodiments of the present invention.
Figure 6C:
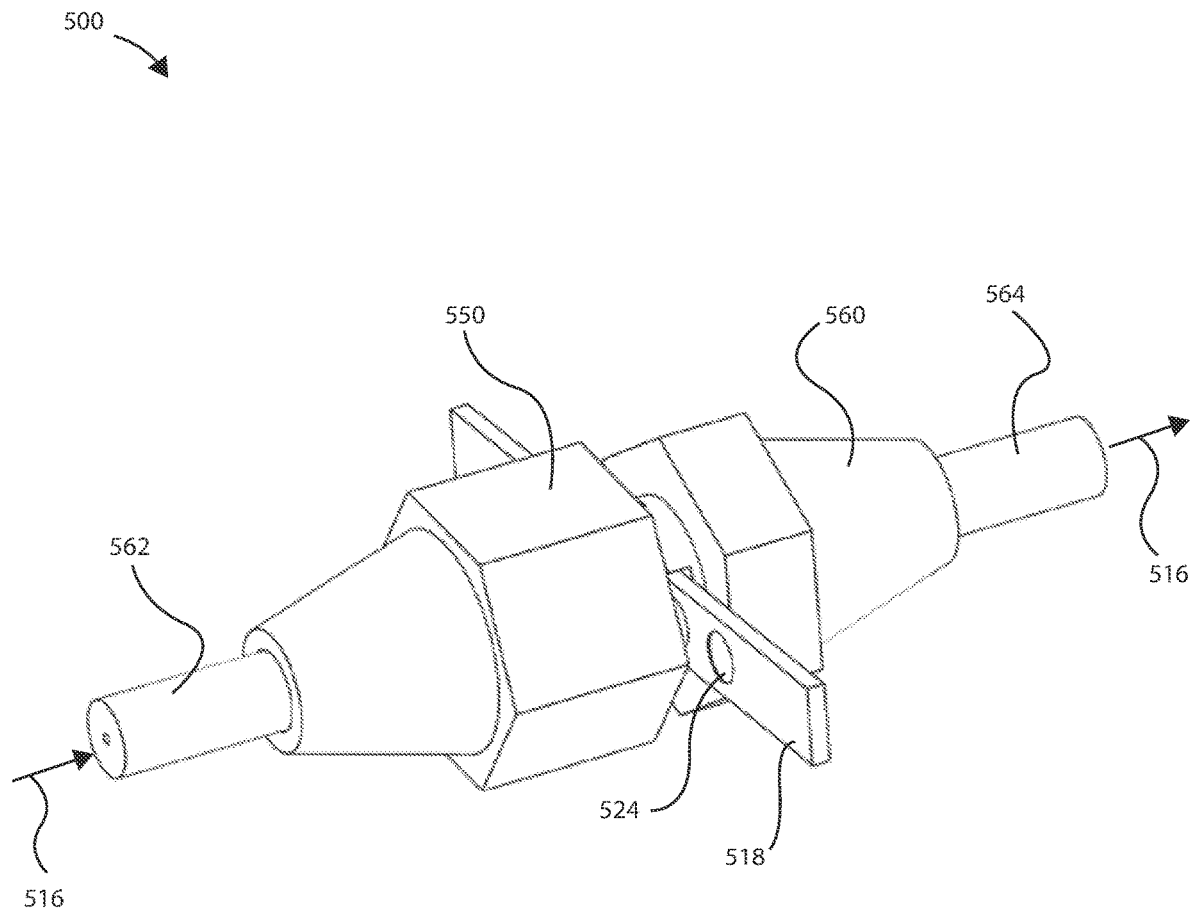
FIG. 6C depicts a perspective view of the filtration device of FIGS. 6A and 6B, in accordance with embodiments of the present invention.
Figure 6D:
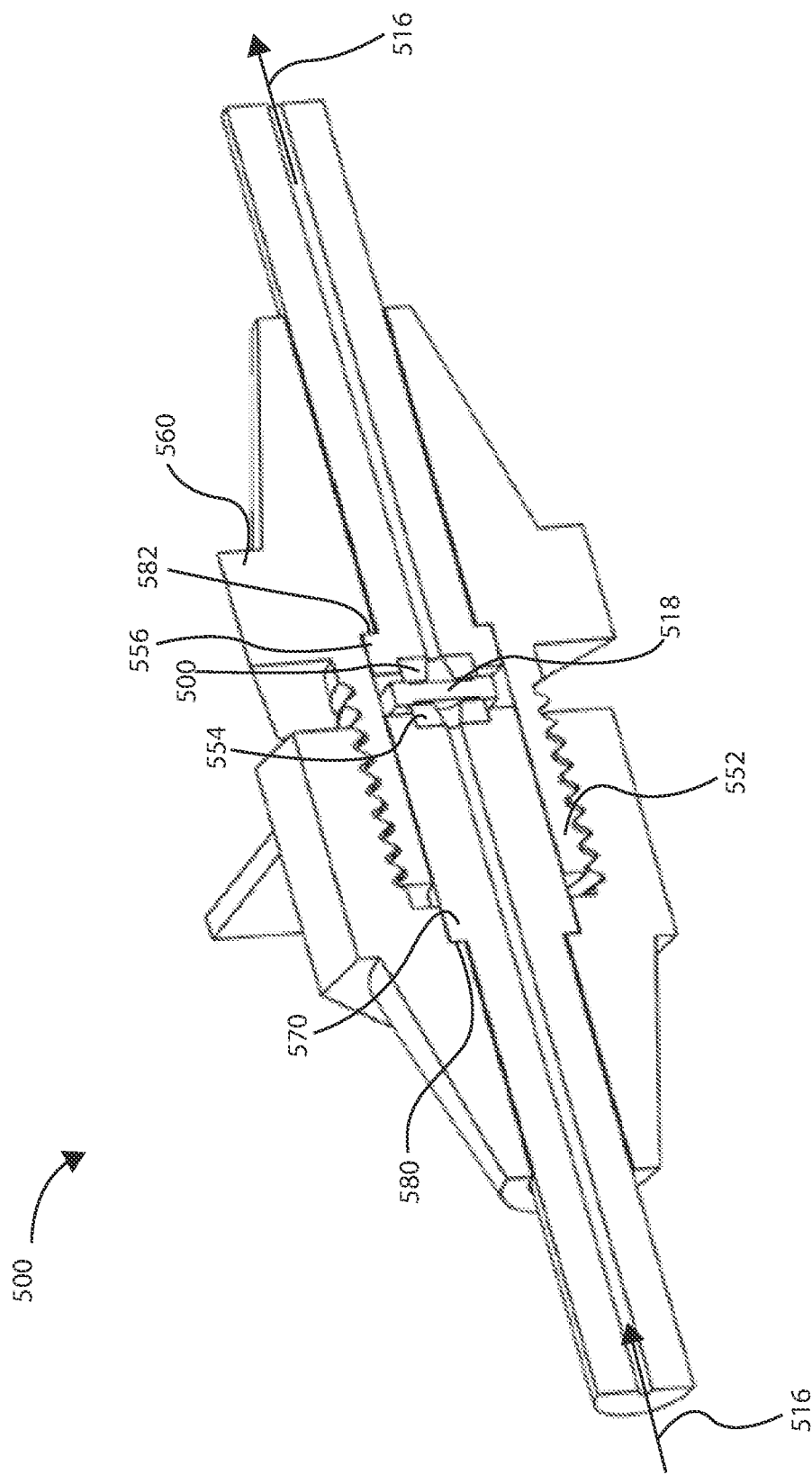
FIG. 6D depicts a side cutaway view of the filtration device of FIGS. 6A-6C, in accordance with embodiments of the present invention.

FIGS. 6A and 6B depict exploded perspective views of another filtration device 500, in accordance with embodiments of the present invention. FIG. 6C shows a perspective view of the filtration device 500 and FIG. 6D shows a side cutaway view of the filtration device 500. The filtration device 500 is shown to display an exemplary dynamic sealing mechanism 510 for providing a fluidic seal between filters 524 of a filter element 518 and a fluidic flow path 516 such that fluid can flow from a fluidic inlet 512 to a fluidic outlet 514 through a filter 524 on the filter element 518. It should be understood that one or more elements and structure described with respect to the sealing of the filtration device 500 may be applicable to the embodiments described hereinabove, including the filtration device 300 and the filtration device 400.

The dynamic sealing mechanism 510 may include a free rotating nut 550 proximate the fluidic path proximate the fluidic inlet 512, and a split male thread 552 surrounding the fluidic path extending from an outlet body 560. A first fluidic tube 562 may be located within the free rotating nut 550. The first fluidic tube 562 may include a larger circumferential region 570 creating a step configured to receive a compression force from a corresponding step 580 of an inner cavity of the free rotating nut 550, as shown in FIG. 6D. A first face seal 554 may be located proximate the free rotating nut 550 and may surround the first fluidic tube 562. The first face seal 554 (shown in FIGS. 6B and 6D) may be configured to provide fluidic sealing between the first fluidic tube 562 and the filter element 518 and filters 524. The first fluidic tube 562 may extend from the fluidic inlet 512 when assembled, as shown in FIG. 6C. In other embodiments (not shown), the first fluidic tube 562 may be flush with the fluidic inlet 512 of the free rotating nut 550.

A second fluidic tube 564 may be located within the outlet body 560. The second fluidic tube 564 may include a larger circumferential region 572 creating a step configured to receive a compression force from a corresponding step 582 of an inner cavity of the outlet body 560, as shown in FIG. 6D. A second face seal 556 may be located proximate the outlet body 560 and may surround the second fluidic tube 564. The second face seal 556 (shown in FIGS. 6A and 6D) may be configured to provide fluidic sealing between the second fluidic tube 564 and the filter element 518 and filters 524. When assembled, as shown in FIG. 6C, the second fluidic tube 564 may extend from the outlet body 560. In other embodiments, the second fluidic tube 564 may be flush with the fluidic outlet 514 of the outlet body 560.

In operation, the free rotating nut 550 may be rotatable about the split male thread 552. When the free rotating nut 550 is tightened, the steps 580, 582 may compress the larger circumferential regions 570, 572 and the first and second face seals 554, 556 into the filter element 518 and filters 524 to create a fluidic seal. The dynamic sealing mechanism 510 may allow for sliding of the filter element 518 under high pressures. In one embodiment, manual rotation or loosening of the free rotating nut 550 may be required before the filter element 518 may be moved to change the filter 524.

In another embodiment, the dynamic sealing mechanism 510 for creating a seal with the filter element 518 and the filters 524 may be automated. In an automated embodiment, a motor may turn the free rotating nut 550 to tighten or loosen the seal to allow for a filter change. In other embodiments, the face seals 554, 556 may be compressed through other automated mechanisms other than the free rotating nut 550 and threaded split collar 552 combination, such as a pneumatic compression system or the like.

FIG. 7 depicts a schematic of a high-pressure gradient mixing pump system 600, in accordance with embodiments of the present invention. In this embodiment, the pump system 600 may include mobile phase bottles 610, 612, pump heads 614, 616, a mixer 618, an injector 620, a chromatography column 622 and a detector 624. Filtration devices 630a, 630b, 630c, 630d, 630e, 630f may be located at various points in the system 600. Embodiments of the present invention described hereinabove with respect to the filtration devices 10, 100, 200, 300, 400, 500 may be incorporated into the filtration devices 630a, 630b, 630c, 630d, 630e, 630f.

Depending on the location of the filter in the system, the filter may include different characteristics. In the pump system 600, filtration devices 630a, 630b may be located between the mobile phase bottles 610, 612 and the pump heads 614, 616. The filters 630a,630b may include a small pressure drop. A small pressure drop may be accomplished by, for example, utilizing high permeability filters or making the dimension of the filters reduce linear velocity (e.g. by using a large thin disk instead of a long narrow rod). Internal volume may not be a limiting characteristic of the filters 630a, 630b. Filtration devices 630c, 630d may be located between the pump heads 614, 616 and the mixer 618. The filtration device 630e may be located between the mixer 618 and the injector 620. The filtration devices 630c, 630d, 630e may be low volume filters. If multiple filters are placed in parallel, they may include equal volume. The filtration device 630f may be located between the injector 620 and the chromatography column 622. The filtration device 630f may be a low dispersion filter. While the embodiment shown includes two pump heads 614, 616 and mobile phase bottles 610, 612, it should be understood that filtration devices consistent with embodiments described hereinabove may be incorporated into systems having more or less than two pumps.

FIG. 8 depicts a schematic of another pump system 700 for low pressure gradient mixing system, in accordance with embodiments of the present invention. In this embodiment, the pump system 700 may include mobile phase bottles 710, 712, 714, 716, a gradient proportioning valve 718, one or more pump heads 720, an injector 722, a chromatography column 724 and a detector 726. Filtration devices 730a, 730b, 730c, 730d, 730e, 730f may be located at various points in the system 600. Embodiments of the present invention described hereinabove with respect to the filtration devices 10, 100, 200, 300, 400, 500 may be incorporated into the filtration devices 730a, 730b, 730c, 730d, 730e, 730f.

In the pump system 700, filtration devices 730a, 730b, 730c, 730d may be located between the mobile phase bottles 710, 712, 714, 716 and the gradient proportioning valve 718. The filters 730a, 730b, 730c, 730d may include a small pressure drop in manners described hereinabove. Internal volume may not be a limiting characteristic of the filters 730a, 730b, 730c, 730d. The filtration devices 730e may be located between the pump head 720 and the injector 722. The filtration device 730e may be a low volume filter. If multiple filters are placed in parallel, they may include equal volume. The filtration device 730f may be located between the injector 722 and the chromatography column 724. The filtration device 630f may be a low dispersion filter. While the embodiment shown includes four bottles 710, 712, 714, 716, it should be understood that filtration devices consistent with embodiments described hereinabove may be incorporated into systems having more or less than four bottles are contemplated.

Various filtration methods are also contemplated that are consistent with the embodiments described hereinabove. In one embodiment, a liquid chromatography filtration method includes providing a fluidic flow path, providing a chromatography column located in the fluidic flow path, and providing a filtration device located in the flow path before the chromatography column. The filtration device may be consistent with embodiments described hereinabove, and may include, for example, a housing having a fluidic inlet and a fluidic outlet and configured to be connected in line with a fluidic flow path such that at least a portion of the fluidic flow path is located between the fluidic inlet and the fluidic outlet. The housing may include at least one filter disposed in the portion of the fluidic flow path. The housing may include a detection system. Methods may include determining with the detection system, when at least one filter is clogged.

The detection system of methods of filtering contemplated herein may include a first pressure gauge located before the filtration device in the fluidic flow path and a second pressure gauge located after the filtration device in the fluidic flow path. Methods may include detecting pressure with the first pressure gauge and the second pressure gauge. The determining that the at least one filter is clogged in contemplated methods of filtering may include determining that a detected pressure difference between the first pressure gauge and the second pressure gauge is greater than a threshold.

Methods of filtering contemplated herein may include providing a filtration device having a filter element mounted on a filter movement stage. Methods may include communication between the filter movement stage and the detection system. A plurality of filters may be disposed on the filter element. Methods may further include moving, with the filter movement stage, the filter element.

Methods of filtering contemplated may further providing with the filtration device a dynamic sealing mechanism. Methods may include creating a fluidic seal between the filter element and the fluidic flow path with the dynamic sealing mechanism such that fluid can flow from the fluidic inlet to the fluidic outlet through the filter element. Methods may further include isolating, with the dynamic sealing mechanism, the filter element from the fluidic flow path. Methods may include moving when the filter element is isolated, with the filter movement stage, the filter element. Methods may further include automatically changing, by the filter movement stage and the filter element, the at least one filter disposed in the portion of the fluidic flow path with the second filter of the plurality of filters when the detection system determines that the at least one filter is clogged. As described above, the filter element may be a ribbon or a disk. The filter movement stage may be rotating cylinders or a motor or mechanical or pneumatically powered device configured to move the disk.

In other embodiments of a method of filtering, the filtration device may include a filter element cleaner in fluidic communication with the at least one filter and in electrical communication with the detection system. Methods may include activating, with the detection system, the filter element cleaner when the detection system determines that the at least one filter is clogged, and flushing, with the filter element cleaner, the at least one filter after activation. Method may further include selectively providing flushing liquid, by the filter element cleaner, to specific filters of a plurality of filters in the filtration device.

Methods may include providing more than one filter element and moving the plurality of filter elements with the filter movement stage. Methods may include moving, by the movement stage, the first filter element and the second filter element substantially simultaneously. Methods may include moving, by the movement stage, the first filter element and the second filter element substantially independently.

Methods of filtering contemplated herein may include chemically interacting with a chemical species in the fluid by the at least one filter. In one embodiment, methods may include providing a non-zero electrical charge to one or more of the filters. Methods may include utilizing filters having features consistent with those described herein above. Methods contemplated may include functionalizing the at least one filter with an acidic functional group and such that the at least one filter bears a negative electrical charge, and connecting one or more electrical leads of the housing to one or more of the plurality of filters. Methods may include functionalizing the at least one filter with an amine functional group such that the at least one filter bears a positive electrical charge.

In cases where a plurality of filters are utilized, methods may include disposing each of the plurality of filters in the fluidic flow path in series, wherein a first of the plurality of filters includes a first pore size, wherein a second of the plurality of filters includes a second pore size smaller than the first pore size, and where a third of the plurality of filters includes a third pore size smaller than the second pore size.

In the case of a filtration device having multiple segments each having one or more filters, methods may include selectively directing, by a flushing valve and a flushing liquid manifold, liquid to a filter of the plurality of filters. The method may further include selectively directing, by the flushing valve and the flushing liquid manifold, liquid to a path segment of the multiple path segments.

Various other methods may be contemplated including determining, by a processor of the filtration device, whether one or more filters of the filtration device is clogged. Methods may include sensing fluid flow velocity both before and after filters, in addition to pressure changes. Methods may include determining using any combination of detected pressure, fluid flow velocity, and time, whether a filter is clogged or whether a replacement is desirable. Methods may include providing a device where the filters are automatically replaceable. Methods may further include utilizing micromachined filters having micromachined pores. Methods may include utilizing filters that may not be sintered filters in a liquid chromatography system. Other methods may include utilizing sintered filters. Methods may include manually changing filters when a detection system determines that it would be desirable to change filters. Methods may include unattaching or unassembling a housing or filtration device to expose filters. Methods may include flushing filters by providing liquid in a reverse direction than the flow path of the fluid through the filter during use. Methods may further include flushing a plurality of filters of a filtration device simultaneously or selectively directing flushing to a filter as needed or detected. The method may include connecting a computing system to the filtration device either internally or externally from the filtration device. Methods may include monitoring by the computer system the status of the filter and determining if the filter is clogged, old or whether it is desirable to change the filter.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A liquid chromatography filtration device, comprising:
   a housing having a fluidic inlet, a fluidic outlet, wherein the housing is configured to be connected in line with a fluidic flow path of a liquid chromatography system such that at least a portion of the fluidic flow path is located between the fluidic inlet and the fluidic outlet;
   at least one filter disposed in the portion of the fluidic flow path;
   a filter element mountable in line with the fluidic flow path, wherein a plurality of filters, including a first filter of the at least one filter, is disposed on the filter element; and
   a dynamic sealing mechanism configured such that:
      when the filter element is in a first slidably engageable position there is a fluidic seal between the at least one filter and the portion of the fluidic flow path; and
      when the filter element is in a second position the portion of the fluidic flow path is isolated from the at least one filter on both sides of the at least one filter.

2. The liquid chromatography filtration device of claim 1, further comprising a detection system configured to automatically determine when the at least one filter is clogged.

3. The liquid chromatography filtration device of claim 2, wherein the detection system includes a first pressure gauge located before the at least one filter in the portion of the fluidic flow path and a second pressure gauge located after the at least one filter in the fluidic flow path.

4. The liquid chromatography filtration device of claim 2, wherein the filter element is mounted on a filter movement stage, wherein the filter movement stage is in communication with the detection system, and wherein the filter movement stage is configured to move the filter element.

5. The liquid chromatography filtration device of claim 1, wherein the at least one filter is made of a micromachined material.

6. The liquid chromatography filtration device of claim 4, wherein the filter movement stage is configured to move the filter element when the filtration device is in the second position to automatically change the at least one filter disposed in the portion of the fluidic flow path with a second filter of the plurality of filters when the detection system determines that the at least one filter is clogged.

7. The liquid chromatography filtration device of claim 4, wherein the filter element is a ribbon.

8. The liquid chromatography filtration device of claim 4, wherein the filter element is a disc.

9. The liquid chromatography filtration device of claim 2, further comprising a filter element cleaner configured to flush the at least one filter, wherein the filter element cleaner is in fluidic communication with the at least one filter and in electrical communication with the detection system, wherein the detection system is configured to activate the filter element cleaner when the detection system determines that the at least one filter is clogged.

10. The liquid chromatography filtration device of claim 9, wherein the at least one filter is a plurality of filters, and wherein the filter element cleaner is configured to provide flushing liquid to be selectively directed to a filter of the plurality of filters.

11. The liquid chromatography filtration device of claim 4, further comprising a second filter element having a second plurality of filters disposed thereon, the second filter element being mounted on the filter movement stage and having a first filter of the second plurality of filters disposed in the fluidic flow path when the filtration device is in the first position, wherein the filter movement stage is configured to move the second filter element when the filtration device is in the second position to remove the first filter of the second plurality of filters out of the fluidic flow path and bring a second filter of the second plurality of filters into the fluidic flow path.

12. The liquid chromatography filtration device of claim 6, wherein the filter movement stage is configured to move the first filter and the second filter substantially simultaneously.

13. The liquid chromatography filtration device of claim 6, wherein the filter movement stage is configured to move the first filter and the second filter substantially independently.

14. The liquid chromatography filtration device of claim 1, wherein the at least one filter is capable of chemical interactions with a chemical species in the fluid.

15. The liquid chromatography filtration device of claim 1, wherein the at least one filter bears a non-zero electrical charge and wherein the housing further comprises one or more electrical leads electrically connected to the at least one filter.

16. The liquid chromatography filtration device of claim 1, wherein the at least one filter includes a pore size between about 0.2 μm and 50 μm and wherein the at least one filter includes a pore size standard deviation less than about 20% of the mean pore size.

17. The liquid chromatography filtration device of claim 1, wherein the at least one filter is functionalized with an acidic functional group and bears a negative electrical charge.

18. The liquid chromatography filtration device of claim 1, wherein the at least one filter is functionalized with an amine functional group and bears a positive electrical charge.

19. The liquid chromatography filtration device of claim 1, wherein the at least one filter is a plurality of filters disposed in the portion of the fluidic flow path in series, wherein a first filter of the plurality of filters includes a first pore size, wherein a second filter of the plurality of filters includes a second pore size smaller than the first pore size, and where a third filter of the plurality of filters includes a third pore size smaller than the second pore size.

20. The liquid chromatography filtration device of claim 1, wherein the at least one filter is a plurality of filters and wherein the portion of the fluidic flow path is comprised of multiple path segments, each path segment having an inflow region and an outflow region, and at least one filter of the plurality of filters disposed between the inflow region and outflow region of each path segment, and wherein:
   the portion of the fluidic flow path comprises a first path segment having an inflow region in fluidic communication with the fluidic inlet;
   a last path segment having an outflow region in fluidic communication with the fluidic outlet; and
   the outflow region of an upstream path segment is in fluidic communication with the inflow region of a downstream path segment.

21. The liquid chromatography filtration device of claim 20, wherein the housing further comprises:
   a flushing liquid manifold in fluidic communication with the portion of the fluidic flow path, the flushing liquid manifold connected to a flushing liquid inlet through a flushing valve; and
   a flushing liquid drain in fluidic communication with the portion of the fluidic flow path, wherein the flushing valve is configured to allow a flushing liquid to be selectively directed to a filter of the plurality of filters,
   wherein the flushing valve is configured to allow a flushing liquid to be selectively directed to a path segment of the multiple path segments.

22. A liquid chromatography system, comprising:
a fluidic flow path;
a chromatography column located in the fluidic flow path;
   a filtration device located in the fluidic flow path before the chromatography column, the filtration device including:
      a housing having a fluidic inlet, a fluidic outlet, wherein at least a portion of the fluidic flow path is located between the fluidic inlet and the fluidic outlet;
   at least one filter disposed in the portion of the fluidic flow path;
   a filter element mountable in line with the fluidic flow path, wherein a plurality of filters, including the at least one filter, is disposed on the filter element; and
   a dynamic sealing mechanism configured such that:
      when the filter element is in a first slidably engageable position there is a fluidic seal between the at least one filter and the portion of the fluidic flow path; and
      when the filter element is in a second position the portion of the fluidic flow path is isolated from the at least one filter on both sides of the at least one filter.

* * * * *